(12) United States Patent
Wu et al.

(10) Patent No.: US 10,645,646 B2
(45) Date of Patent: May 5, 2020

(54) COMMUNICATION SYSTEM AND A METHOD FOR OPERATING OR EVALUATING THE SAME USING SELECTIVE BASE STATION SLEEPING

(71) Applicant: City University Of Hong Kong, Kowloon (HK)

(72) Inventors: Jingjin Timothy Wu, Kowloon (HK); Wing Ming Eric Wong, Kowloon (HK); Moshe Zukerman, Kowloon (HK); Jun Guo, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 15/867,961

(22) Filed: Jan. 11, 2018

(65) Prior Publication Data

US 2019/0215766 A1 Jul. 11, 2019

(51) Int. Cl.
| | |
|---|---|
| *G08C 17/00* | (2006.01) |
| *H04W 52/02* | (2009.01) |
| *H04W 36/16* | (2009.01) |
| *H04W 72/08* | (2009.01) |
| *H04W 72/04* | (2009.01) |
| *H04W 24/02* | (2009.01) |

(52) U.S. Cl.
CPC ....... *H04W 52/0206* (2013.01); *H04W 24/02* (2013.01); *H04W 36/16* (2013.01); *H04W 52/0225* (2013.01); *H04W 72/0473* (2013.01); *H04W 72/08* (2013.01)

(58) Field of Classification Search
CPC .................................................. H04W 52/0206
See application file for complete search history.

(56) References Cited

U.S. PATENT DOCUMENTS

| | | | |
|---|---|---|---|
| 2010/0151920 A1* | 6/2010 | Song ................. | H04W 52/0216 455/574 |
| 2011/0207500 A1* | 8/2011 | Nakamura .......... | H04W 52/325 455/522 |
| 2011/0287756 A1* | 11/2011 | Cho ................... | H04W 52/0229 455/418 |
| 2013/0095811 A1* | 4/2013 | Okino ............... | H04W 52/0206 455/418 |
| 2013/0235774 A1* | 9/2013 | Jo ..................... | H04W 52/0219 370/311 |
| 2014/0219243 A1* | 8/2014 | Meshkati ............ | H04W 52/243 370/331 |
| 2017/0272992 A1* | 9/2017 | Fujishiro ............. | H04W 36/22 |

* cited by examiner

*Primary Examiner* — Gerald A Smarth
(74) *Attorney, Agent, or Firm* — Renner Kenner Greive Bobak Taylor & Weber

(57) ABSTRACT

A communication system and method for operating or evaluating the communication system includes powering a plurality of base stations each operating in at least a sleep mode and an active mode, wherein the base station operates in the sleep mode with less power consumption than in the active mode; analyzing an overall power consumption for powering the plurality of base stations with respect to a grade of service of the communication system; and switching at least one of the plurality of base stations to operate between the sleep mode and the active mode based on a result associated with the overall power consumption and/or the grade of service. Each of the plurality of base stations in sleep mode is further arranged to pass a service request to a nearby base station in the plurality of base stations such that the service request is handled by the respective nearby base station.

25 Claims, 15 Drawing Sheets

One BS in sleep

All BSs active

COMMUNICATION SYSTEM AND A METHOD FOR OPERATING OR EVALUATING THE SAME USING SELECTIVE BASE STATION SLEEPING

TECHNICAL FIELD

The present invention relates to a communication system and a method for operating or evaluating the communication system, and particularly, although not exclusively, to a system and a method for processing and evaluating power management in a communication system.

BACKGROUND

Base station is widely used in telecommunication industry. It provides a connection between mobile phones and the cellular network by receiving and transmitting signals in the network to users and their devices. Since each base station only covers a limited area, a network of base stations is usually set up to cover a larger distance for enabling users to request for a service or task at different locations.

With the rapid growth and development of telecommunication, more and more communication systems and base stations are set up to meet with the increasing demand. However, it also leads to a surge in energy consumption and pollution, posing a noticeable impact on the environment. Not only do the communication systems require a lot of energy for active functioning, they may also require an air-conditioning system for cooling, and further contribute to noise pollution, global radiation, temperature increase, etc. Therefore, it may be necessary to evaluate the energy consumption and the performances of the base stations in a regular basis.

SUMMARY OF THE INVENTION

In accordance with a first aspect of the present invention, there is provided a method for operating a communication system, comprising the steps of: a plurality of base stations each operating in at least a sleep mode and an active mode, wherein the base station operates in the sleep mode with less power consumption than in the active mode; analyzing an overall power consumption for powering the plurality of base stations with respect to a grade of service of the communication system; and switching at least one of the plurality of base stations to operate between the sleep mode and the active mode based on a result associated with the overall power consumption and/or the grade of service; wherein each of the plurality of base stations is further arranged to pass a service request to an nearby base station in the plurality of base station such that the service request is handled by the respective nearby base station.

In an embodiment of the first aspect, the plurality of base stations are further arranged to operate in the sleep mode or the active mode based on a plurality of sleeping patterns.

In an embodiment of the first aspect, each of the plurality of sleeping patterns defines a relationship between a plurality of nearby base stations.

In an embodiment of the first aspect, each of the plurality of sleeping patterns includes at least one base station operating in the active mode and at least one base station operating in the sleep mode.

In an embodiment of the first aspect, the base station operating in the sleep mode is arranged to overflow the service request reaching the respective base station to an alternative base station of the plurality of nearby base stations, wherein the alternative base station is operating in the active mode.

In an embodiment of the first aspect, the base station operating in the active mode is arranged to overflow the service request being processed by the respective base station to an alternative base station of the plurality of nearby base stations, wherein the alternative base station is operating in the active mode.

In an embodiment of the first aspect, the step of switching at least one of the plurality of base stations to operate between the sleep mode and the active mode includes switching the plurality of base stations to operate in a selected one of the plurality of sleeping patterns.

In an embodiment of the first aspect, the step of analyzing the overall power consumption with respect the grade of service includes estimating the overall power consumption and the grade of service of the communication system when the plurality of base stations operates based on each of the plurality of sleeping patterns.

In an embodiment of the first aspect, the grade of service is represented by at least one attributes associated with the performance of the plurality of base station in processing service requests reaching the plurality of base stations.

In an embodiment of the first aspect, the at least one attributes includes a blocking probability in processing the service requests and a predetermined traffic load offered by the communication system.

In an embodiment of the first aspect, the method further comprises the step of determining a representation associated with the at least one attributes and each of the plurality of sleeping patterns using an analytical approximation.

In an embodiment of the first aspect, the representation is further associated with a handover rate of the service requests processed by the plurality of base stations.

In an embodiment of the first aspect, the representation is further associated with parameters including an origin of the service request, an overflow record of the service request and an estimation of a network congestions within the plurality of base stations.

In an embodiment of the first aspect, the plurality of base stations are arranged to facilitate a cellular network.

In accordance with a second aspect of the present invention, there is provided a communication system comprising: a communication module including a plurality of base stations each arranged to operate in at least a sleep mode and an active mode, wherein the base station operates in the sleep mode with less power consumption than in the active mode; an analyzer module arranged to analyze an overall power consumption for powering the plurality of base stations with respect to a grade of service of the communication system; and a control module arranged to switch at least one of the plurality of base stations to operate between the sleep mode and the active mode based on a result associated with the overall power consumption and/or the grade of service; wherein each of the plurality of base stations is further arranged to pass a service request to a nearby base station in the plurality of base station such that the service request is handled by the respective nearby base station.

In an embodiment of the second aspect, the plurality of base stations are further arranged to operate in the sleep mode or the active mode based on a plurality of sleeping patterns.

In an embodiment of the second aspect, each of the plurality of sleeping patterns defines a relationship between a plurality of nearby base stations.

In an embodiment of the second aspect, each of the plurality of sleeping patterns includes at least one base station operating in the active mode and at least one base station operating in the sleep mode.

In an embodiment of the second aspect, the base station operating in the sleep mode is arranged to overflow the service request reaching the respective base station to an alternative base station of the plurality of nearby base stations, wherein the alternative base station is operating in the active mode.

In an embodiment of the second aspect, the base station operating in the active mode is arranged to handover the service request being processed by the respective base station to an alternative base station of the plurality of nearby base stations, wherein the alternative base station is operating in the active mode.

In an embodiment of the second aspect, the control module is arranged to switch at least one of the plurality of base stations to operate between the sleep mode and the active mode by switching the plurality of base stations to operate in a selected one of the plurality of sleeping patterns.

In an embodiment of the second aspect, the analyzer module is arranged to analyze the overall power consumption with respect the grade of service by estimating the overall power consumption and the grade of service of the communication system when the plurality of base stations operates based on each of the plurality of sleeping patterns.

In an embodiment of the second aspect, the grade of service is represented by at least one attributes associated with the performance of the plurality of base station in processing service requests reaching the plurality of base stations.

In an embodiment of the second aspect, the at least one attributes includes a blocking probability in processing the service requests and a predetermined traffic load offered by the communication system.

In an embodiment of the second aspect, the analyzer module is further arranged to determine a representation associated with the at least one attributes and each of the plurality of sleeping patterns using an analytical approximation.

In an embodiment of the second aspect, the representation is further associated with a handover rate of the service requests processed by the plurality of base stations.

In an embodiment of the second aspect, the representation is further associated with parameters including an origin of the service request, an overflow record of the service request and an estimation of a network congestions within the plurality of base stations.

In an embodiment of the second aspect, the plurality of base stations are arranged to facilitate a cellular network.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
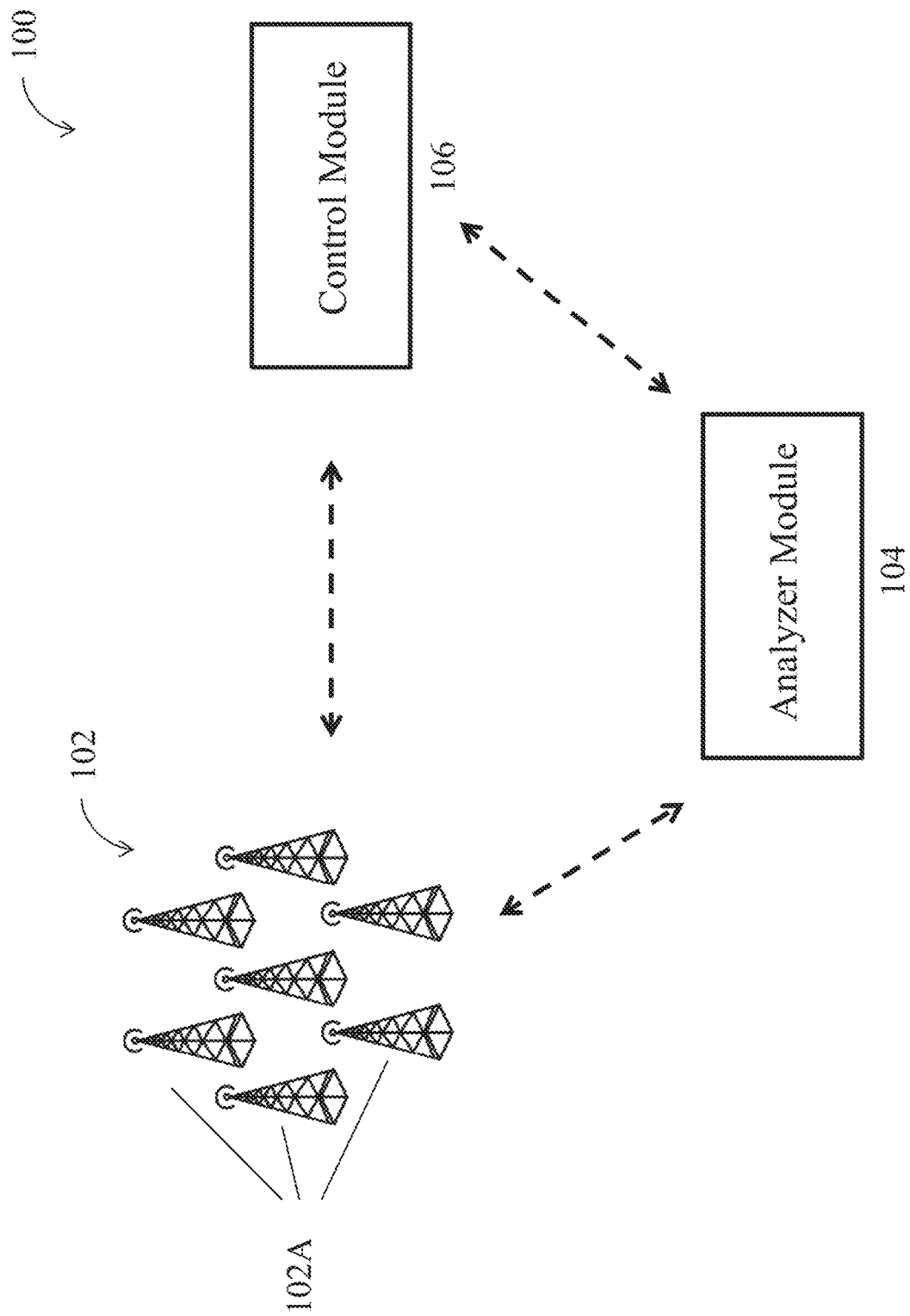
FIG. 1 is an illustration of a communication system in accordance to one embodiment of the present invention.

The inventors have, through their own research, trials and experiments, devised that energy efficiency is an important aspect in cellular mobile network operators due to environmental and economic concerns. Reduction in energy consumption reduces pollution and greenhouse gas, and brings cost-saving benefits to operators and consumers.

Base station (BS) sleeping may be applied to reduce energy consumption in cellular networks. BSs account for 50%-80% of the total energy consumption by cellular networks. They are usually designed for peak hour traffic. However, traffic demands at individual BSs may be highly variable both temporally and spatially. As a result, a significant amount of energy can be wasted in under-utilized BSs, if all BSs operate in active mode all the time. Therefore, it is reasonable to selectively switch some of the BSs to "sleep mode", a low power consuming mode where only minimal structure required for re-activation operation is kept on. For example, a macro BS in sleep mode may consume less than 7% of the energy that is required by an active BS operating at full load. Meanwhile, the remaining active BSs cooperatively extend coverage for calls which would have required service from those BSs that entered sleep mode.

While it is desirable to save energy by BS sleeping, it is also important to maintain the grade of service (GoS) when the total network capacity is reduced due to BS sleeping. That is, there exists a trade-off between energy saving and GoS requirements. Relaxing GoS constraints normally enables more energy savings, whereas tightening GoS constraints may increase energy consumption with fewer sleeping BSs. Therefore, quantitative means are required for assessing such trade-off, particularly, to evaluate the GoS for each energy saving scheme.

Compared to the other green techniques such as upgrading hardware components to more energy-efficient standards, BS sleeping may provide the advantages of minimal deployment and replacement cost as all the operations could be implemented on existing network infrastructure. In one example implementation, energy savings may be achieved by different switching patterns of BSs. It assumes that the remaining active BSs are able to serve all the calls during low traffic hours, but it did not take GoS degradation into consideration.

In another example embodiment, there is provided a two-stage dynamic algorithm to optimize the trade-off between energy consumption and blocking probability in renewable energy powered cellular networks without considering overflow traffic.

A number of factors may affect the effectiveness of different BS sleeping strategies in terms of energy saving and GoS impact. The impact of different scheduling and user association schemes may be analyzed by active BSs on the spectral efficiency of users originally associated with BSs that entered sleep mode. The energy saving and delay trade-off may also be analyzed, such that a policy may be developed to choose the optimal time to trigger BS sleep mode based on minimal total power needed to support a certain offered traffic load.

Different progressive BS switching patterns may be adopted according to traffic patterns in order to maximize energy saving. The outage probability of users may be considered based on path-loss and fading effects. For example, all the GoS, or QoS measures, used in delay, outage probability or spectral efficiency, may be obtained by Monte-Carlo simulations.

An example of GoS measure in cellular network is call blocking probability, which may be generally defined as the number of calls that are blocked entry or dropped during service divided by the total number of call arrivals. It is an important GoS measure for cellular networks, and may be also applicable in cellular network where data traffic is dominant. Blocking probability is a useful measure for real-time mobile applications such as video streaming, mobile gaming and video conferencing. In order to satisfy Quality of Service (QoS) requirements such as delay and data rate in addition to the above mentioned blocking probability GoS requirement, it is preferable to limit the number of admitted connections served by a given BS. Preferably, the blocking probability may be equivalent to the probability that a connection is rejected for admission because of the need to meet the application QoS requirements.

Unfortunately, it may not be always possible to explicitly obtain an analytical expression for the blocking probability. Computer simulation may be used to evaluate the performance of various cellular networks. However, simulations may be time consuming, especially, for large systems. On the other hand, analytical approximations may be more computationally efficient. This is especially important when the evaluation is used as a module in a network design tool for searching optimal solutions where computational efficiency is required for such optimization procedures.

Therefore, analytical approximation methods may be utilized to evaluate blocking probability in cellular networks. Advantageously, the time required to obtain an approximation is often several orders of magnitude less than the time required for a simulation. The most prominent concern for approximations, however, is the accuracy.

In accordance with an embodiment of the present invention, the method may be used for evaluating blocking probabilities on the overflow loss system model, which forms an important class of teletraffic models for evaluating system performance.

The definition of traffic overflow, may be: 1. That condition wherein the traffic offered to a portion of a communication system exceeds its capacity and the excess may be blocked or may be provided with alternate routing, or 2. the excess traffic itself.

In this disclosure, the shorter term "overflow" is referred to the condition of traffic overflow, and the term "overflow traffic" is referred to the excess traffic itself. "Overflow" may also be used as a verb to describe "action" by the access traffic when it is blocked or provided with alternate routing.

Overflow loss systems are systems or networks where overflow traffic may exist. In such systems, if all servers in the primary server group are unavailable, overflow traffic is either blocked and cleared from the system, or it overflows to an alternative server group. In cellular networks with BS sleeping, overflow(s) may occur when a call attempts a sleeping or full-loaded BS. In this case, an active BS nearby with available capacity will serve as the alternative server group for the call rejected by the sleeping or fully-loaded BS.

The exact blocking probability in such overflow loss systems may be obtained by solving a set of steady-state equations for a multi-dimensional Markov process, with each dimension represents the state of one server group in the system. However, this method may not be preferable in an overflow loss system as such system generally does not have a closed form solution for blocking probability. Also, due to the curse of dimensionality, this method is not scalable for systems of practical size as the state space increases explosively when the system becomes large. Therefore, it is more preferable to estimate the blocking probability by analytical approximations.

Preferably, approximation methods such as Erlang Fixed-Point Approximation (EFPA), for blocking probability in overflow loss systems, may be adopted. Cellular networks with channel borrowing mechanism may be modelled as overflow loss systems and EFPA may be used to estimate the blocking probabilities.

As discussed above, blocking probability in cellular networks may be evaluated by computer simulations, alternatively, analytical means may also be used. For example, a minimal blocking probability may be estimated for simple cellular networks with dynamic channel allocation and flow control. The blocking probability in a two-tier cellular network consisting of micro-cells and umbrella-cells may also be approximated, where calls first attempt the micro-cells and overflow to umbrella-cells if no channels in micro-cells are available. Other approximation methods such as multiservice overflow approximation may also be used to evaluate blocking probability in a similar two-tier cellular network structure.

However, none of these methods considered possible mutual traffic overflow among BSs, due to channel borrowing or user association techniques, by which a user is able to use a channel, or capacity originally assigned to another BS, if the first BS it attempts cannot offer the required service due to insufficient capacity or sleep mode operation. Such mutual overflow effect does not exist in models with hierarchical structure, where the overflows are only assumed to occur unidirectionally from the micro-cells to the umbrella-cells, but not the other way around, or bidirectionally between two micro-cells.

By contrast, in non-hierarchical cellular network structure where overflow traffic flows bilaterally, congestion in a particular BS would cause increasing overflow traffic to other BSs, which may in turn yield more overflow traffic to the original BS. Mutual overflow adversely affects the accuracy of approximations, when they are used for cellular networks with mutual overflow.

With channel borrowing, calls that arrive at fully-loaded or sleeping BSs can be served by neighboring BSs with idle capacity. Therefore, cellular networks with BS sleeping can be modelled as an overflow loss system.

Preferably, a BS here may be regarded as a server group, and each channel (serving a single call) in the BS is a server. In the case without channel borrowing, EFPA can be used to approximate blocking probability in cellular networks with the consideration of call mobility among cells with high accuracy. Advantageously, EFPA is accurate in assessing blocking probabilities for new and handover calls with different control strategies in a multi-cell multi-class cellular network model with symmetric traffic loading.

Without wishing to be bound by theory, channel borrowing mechanism or user association process are important parts of the technical basis of BS sleeping. Particularly, the user association process allows users originally associated with BSs that entered the sleep mode to be reassociated with nearby active BSs.

Overflow traffic in cellular networks with BS sleeping, especially because of the mutual overflow effect caused by the user association process, may lead to inaccurate estimation of blocking probability by EFPA. In one example, EFPA is considered without moment matching, in this consideration, EFPA may be considered as a classical approximation method based on Poisson and independence assumptions. The Poisson assumption assumes that if the arrival process is Poisson, the overflow traffic also follows a Poisson process. The independence assumption assumes that all server groups are mutually independent. However, it is known that the mean rate of overflow traffic is higher than its variance implying that modelling it by a Poisson process introduces errors, and that the server groups are not statistically independent because a busy server group is likely to imply that other server groups are also heavily loaded at the same time.

Due to these two assumptions, preferably, EFPA may dramatically reduce the computing time as compared to the original multi-dimensional Markov process. However, they also lead to inaccurate estimates in various scenarios. Several methods may be used to combat the errors of EFPA, e.g., using moment matching techniques to reduce errors due to the Poisson assumption or derive conditional probabilities to reduce errors due to the independence assumption. However, the improvement of EFPA using moment matching techniques is marginal in systems involving mutual overflow (where the independence error is dominant) while the conditional probabilities derivation method is not scalable.

Another approach is to apply the technique used in EFPA, i.e., decoupling the system into independent Erlang B subsystems, to a certain surrogate of the original system. For example, in the surrogate model used in Overflow Priority Classification Approximation (OPCA), calls may be classified based on the number of overflows they experience. A preemptive priority regime, where a junior call with a lower number of overflows is entitled to preemptive priority over a senior call with a greater number of overflows, is incorporated into the original model. That is, a senior call in service must give up its own channel during its service period if a junior call requests it. Alternatively, this preemptive process can be viewed as if the arriving junior call and the senior call in service exchanged their identity upon the arrival. In this way, the congestion information carried by the senior call can be used by the junior call.

By decoupling the system of the surrogate model into independent Erlang B subsystems as in EFPA, OPCA is able to reduce the errors due to the independence assumption in EFPA by capturing state dependencies among overflow traffic. It has been shown to be quite accurate in systems where all calls have full access to all server groups. However, cellular networks can be viewed as partially accessible networks as it is unlikely for a call to visit all the BSs in the system during its lifetime. The rudimentary approach of OPCA is shown to be inaccurate in such systems.

According to an embodiment of the present invention, there is provided an example method involving two EFPA-based approximation techniques, i.e. the EFPA and a versatile approximation method, namely Information Exchange Surrogate Approximation for Cellular Networks (IESA-CN).

The IESA-CN approach is based on an Information Exchange Surrogate Approximation (IESA) framework, develops a surrogate model called an information exchange system (IES). It features an information exchange mechanism in which incoming calls may exchange certain congestion information with calls in service. Unlike IESA, IESA-CN captures unique features in cellular networks.

The IESA framework, with its roots in EFPA and OPCA, may be used to estimate blocking probability in partially-accessible networks. Instead of literally swapping the calls as in OPCA, the calls in IESA only exchange certain congestion information while retaining their own identities and overflow records in the IES (i.e. the surrogate model associated with IESA). IESA could be quite accurate if a suitable surrogate is chosen for the system concerned.

The IESA framework may be further modified to estimate the blocking probabilities in Video on Demand (VoD) systems. However, it will not yield an accurate approximation for blocking probability in cellular networks due to the inherent differences between these two systems. In VoD systems, a request is possibly able to overflow to any disks where a copy of the requested movie is available. However, in cellular networks, when a call is rejected by a BS due to sleeping or insufficient capacity, it can only overflow to nearby BSs due to limited signal strength (the locality feature). In this sense, the statistical dependencies among states of local BSs in cellular networks are stronger as they are more highly correlated.

Furthermore, in cellular networks, the set of BSs that a given call is allowed to overflow to is changed when the call performs a handover from one BS to another (the mobility feature). This situation does not exist in VoD systems where the set of accessible disks is determined upon the initiation of a request and remains fixed throughout its lifetime. Therefore, the surrogate used in these previous examples may be inappropriate, and its corresponding blocking probability approximation is inaccurate for the current problem.

With reference to FIG. 1, there is provided a communication system 100 comprising: a communication module 102 including a plurality of base stations 102A each arranged to operate in at least a sleep mode and an active mode, wherein the base station 102A operates in the sleep mode with less power consumption than in the active mode; an analyzer module 104 arranged to analyze an overall power consumption for powering the plurality of base stations 102A with respect to a grade of service (GoS) of the communication system 100; and a control module 106 arranged to switch at least one of the plurality of base stations 102A to operate between the sleep mode and the active mode based on a result associated with the overall power consumption and/or the grade of service; wherein each of the plurality of base stations is further arranged to pass a service request to a nearby base station in the plurality of base station such that the service request is handled by the respective nearby base station.

In this embodiment, the communication system 100 may be arranged to facilitate a cellular network, such as a mobile communication network for mobile communication devices. The communication module 102 comprises a plurality of base station in associated with each other, so as to facilitate the data communication and/or the network traffic between communication devices serviced within the network coverage of the cellular network formed by the plurality of base stations.

For example, a service request, such as a transmission of a data packet, a voice call, a text message, a voice message or a video stream, may be initiated by a mobile device (not shown). The service request may be handled or processed by one of the base stations 102A within the cellular network, preferably the one with the strongest signal strength between the base station 102A and the mobile device when the service request is initiated or being processed.

Each of the plurality of base stations 102A may communicate directly with other base stations within the network, or through the analyser module 104 and/or the control module 106. In this example, there are seven base stations 102A. In other examples, there may be three, ten, twenty, or a different number of base stations, depending on the service required. The communication between each base station is preferably wireless, but may also be wired.

With the communication capability between the base stations 102A, each of the base stations 102A may pass a service request to a nearby base station, such that the service request may be handled by the respective nearby base station. As discussed above, base stations may overflow or handover the service requests or the calls to an alternative base station within the same network (or a sub-network within the network) due to a local or a mobile demand. Preferably, the alternative base station is close to the base station where the service request first attempts.

The communication module 102 is further in communication with the analyser module 104. The analyser module 104 is included for analysing the performance of each individual base station or the whole network of base stations. Performance of base stations 102A or the communication module 102 may include overall power consumption, energy efficiency and GoS. The analyser module 104 may further comprise a memory for storing the analysed performance results. Optionally, the analyser module 104 may transfer the analysed performance results to a storage cloud wireless for data record.

The analyser module 104 may communicate the analysed performance results with the control module 106. The control module 106 may include a control system for switching the communication module 102 to operate in different operating policies or in the sleep/active mode so as to optimize the energy efficiency of the system. The control module 106 may separately control each individual base station in the communication module 102 or the whole network of base stations 102A.

Each of the analyzer module 104 and the control module 106 may be wholly or partly included in a computer server including a processor for executing suitable computer-executable instructions in performing the analysis. Alternatively, each of the analyzer module 104 and the control module 106 may be implemented as a dedicated apparatus or system which is specifically design to analyze the performances of the base stations and to control the operations of the base stations according to the results of the analysis.

Consider a cellular network with multiple interconnected BSs. U is defined as the set of all BSs in the network, and let $\Gamma i \subset U$ denote the set of BSs that a call originated from BS i is allowed to overflow. The number of BSs to which a call originated from i has access is denoted by $ni=|\Gamma i|$. The set of traffic source cells that have access to i is denoted by $\Phi i$. In this example, handover calls are not prioritize over new calls. Priority policies involving granting preemptive priority to handover calls, allowing handover calls to wait in the buffer, or reserving a proportion of channels exclusively for handover calls can be incorporated into the method by treating new calls and handover calls as two different classes, and applying approximation techniques to each of them. Therefore, to avoid ambiguity, as the new call blocking probability and handover forced termination probability are equal, both are referred as blocking probability.

Preferably, the method may be used in a homogeneous cellular network without inter-layer overflow traffic such as that from micro cells to underlying macro cells. It may also be applicable in examples with irregular cell layouts. Moment matching, which is a technique to approximate blocking probabilities in multi-layer overflow loss systems, may also be incorporated with the IESA framework to evaluate the blocking probabilities in heterogeneous cellular networks.

In cellular networks, packet-switched data may be the dominant traffic due to the popularity of multimedia mobile applications. Therefore a multi-service multi-rate loss model may be required for such systems. EFPA or EFPA-based approximations may be applied to multi-service multi-rate systems. Single rate is assumed for simplicity, and the method may also extend to multi-service multi-rate models.

It may be assumed that new calls arrive at BS i following a Poisson process with rate $\lambda_i$. The assumption of Poisson arrivals is fundamental in EFPA. It will be discussed later that because the system is not very sensitive to the burstiness in the arrival process, the method is also fairly accurate for systems with more bursty arrivals, that may be modeled by a Markov modulated Poisson process (MMPP).

Call service times may be independent and exponentially distributed with mean $1/\mu_i$. Call sojourn times in each BS may be assumed to be independent and exponentially distributed with mean $1/\delta_i$. For simplicity, the values of $\mu_i$ and $\delta_i$ are assumed equal across all BSs, thus they can be denoted as $\mu$ and $\delta$. In this sense, each BS can be modeled as an M/M/c/c queue. The state of BS i is denoted by $S_i$, where $S_i=0$ if i is sleeping, while $S_i=1$ if i is active.

It is found that the blocking probabilities are nearly insensitive to service and sojourn time distributions. The symmetric random walk model may be adopted to characterize call mobility. In such a model, a call leaving a cell will move to any one of the neighboring cells with equal probability. Also, for simplicity and without loss of generality, all BSs are assumed to have the same number of channels, denoted as $c=c_i$ for all $i \in U$.

The traffic offered (in Erlangs, similarly hereinafter) to a particular BS i may be denoted as $A_i = \lambda_i/\mu$. The total traffic offered to the system is thus $$A = \sum_{i \in U} A_i.$$

A call may leave its current serving BS under either one of two following conditions: 1) the call completes its service and leaves the system, and 2) the call performs a handover to a neighboring cell served by another BS (due to the mobility of calls).

Assuming that service and sojourn times are independent and exponentially distributed, the probability θ that a call in the network performs a handover given that it has not been completed, is given by $$\theta = \frac{\delta}{\mu + \delta}. \tag{1}$$

$\hat{B}_i$ may be defined as arrival rate of new and handover calls $\lambda_i^t$ for i can be obtained by $$\lambda_i' = \lambda_i + \sum_{j \in Y_i} \lambda_j'(1 - \hat{B}_j)\theta \tag{2}$$

in which $\gamma_i$ is the set of direct neighbor BSs of i.

$A_i^t$ may be defined as the effective offered traffic to i after taking the mobility of calls into consideration. It is given by $$A_i' = \frac{\lambda_i'}{\mu + \delta}. \tag{3}$$

Taking the mobility feature into account, let $B_i^{call}$ denote the probability that a call originated from BS i cannot complete its service due to blocking or dropping. Given and $\hat{B}_i$ and θ, $B_i^{call}$ may be derived by another set of fixed-point equations:

$$B_i^{call} = \hat{B}_i + \theta(1 - \hat{B}_i)\frac{1}{|Y_i|}\sum_{j \in Y_i} B_j^{call}. \tag{4}$$

The first term ($\hat{B}_i$) in (4) represents the probability that the call is blocked upon its initiation at i, and the second term represents the probability that the call is successfully admitted to i but dropped upon a handover attempt before its completion.

Henceforth, it may be assumed that for any $i \in U$ that $\gamma_i$ and $\Gamma_i$ coincide and are the set of its direct neighbors. This means that a call arriving at i is able to use (borrow) channels in all its direct neighboring BSs if BS i itself is sleeping or has no vacant channels. Meanwhile, a call can perform multiple handovers across neighboring BSs during its service period.

Based on the above analyzing techniques, the analyzer module may analyze the overall power consumption with respect the grade of service by estimating the overall power consumption and the grade of service of the communication system 100 when the plurality of base stations 102A operates based a plurality of sleeping patterns. The sleeping patterns define relationships between a plurality of nearby base stations.

For example, with reference to FIGS. 4A to 4D, each of the hexagonal patterns in white and black color represents a base station 102A operating in the active mode and the sleep mode respectively. In these patterns, there are at least one base station operating in the active mode and at least one base station operating in the sleep mode.

As discussed earlier, different numbers of base stations 102A operating in either the sleep mode or the active mode may result in different overall power consumption as well as the grade of service of the communication system 100. It should be understood that more base stations 102A operating in the active mode may handle or process the service requests more efficiently but may also consume more power. Therefore, the control module 106 is used for switching the base stations 102A to operate between the sleep mode and the active mode by switching the base stations 102A to operate in a selected one of the plurality of sleeping patterns, so as to maximize the power efficiency for operating the communication system 100.

Preferably, the grade of service may be represented by at least one attributes associated with the performance of the plurality of base station 102A in processing service requests reaching the plurality of base stations. This may include a blocking probability in processing the service requests and a predetermined traffic load offered by the communication system 100.

With these attributes, the analyzer module 104 may determine a representation associated with the performance of the base stations 102A and each of the different sleeping patterns using an analytical approximation. Other parameters may also be considered for the evaluation of the performance of the communications system 100, including but not limited to a handover rate of the service requests processed by the plurality of base stations 102A, which indicates the calls or service requests being passed by multiple base stations, in consideration of both the locality and the mobility behaviour of the services.

In order to perform the information exchange mechanism and estimate blocking probability, several attributes or parameters may be assigned to calls in the model or the representation associated with the performance and the sleeping patterns of the base stations. This may include an origin of the service request, an overflow record of the service request and an estimation of the level of congestions within the plurality of base stations.

The first attribute is the call identity I, which contains information including the call's origin, the call's expected service time and sojourn time in each server group, and the elapsed time since the call's inception. The second attribute, denoted by Δ, is defined as the set of server groups that the call has already attempted and overflowed, or overflow record of the call. Correspondingly in the model, Δ represents the set of BSs that has rejected admission of the call due to no available channels. The third attribute, denoted by Ω, represents an estimate of network congestion, which can be used to capture the statistical dependencies in the entire network.

Call $\zeta$, with its first, second and third attributes being $I\zeta$, $\Delta\zeta$, $\Omega\zeta$, may be assigned respectively, as an $(I\zeta, \Delta\zeta)$-call or $(I\zeta, \Delta\zeta, \Omega\zeta)$-call. Attributes of a call may be updated or exchanged during the call's sojourn time in the network. The specific rules of updating or exchanging depend on the approximation method used. It is assumed that call $\zeta$ generated in BS i determines its next overflow destination by random hunting in $\Gamma_i$-$\Delta\zeta$, which is the set of BSs that the call has access to and not yet attempted. As the nature of random hunting requires keeping track of each random sequence of BSs that a call attempts, $\Psi(X, x)$, $x=0, 1, \ldots, |X|$ is defined as the set of choices of x elements from X. By definition, $\Psi(X, 0)=\emptyset$.

The attributes are created for the information exchange mechanism in the surrogate model under the IESA framework. The values of the attributes are helpful in calculating blocking probabilities by EFPA. In some example, a "true model" is the original cellular network model for which aims to evaluate estimate the blocking probability by simulation or approximations. Accordingly, notations for attributes and their values are only relevant to EFPA, IESA-CN, and IES-CN (the surrogate model of IESA-CN).

In one example embodiment, EFPA decouples a system of k server groups (or k BSs) into k independent Erlang B subsystems. This is consistent with the previous assumption to model BSs as M/M/c/c queues. The load offered to each BS includes the original traffic, the handover traffic, plus all the traffic that overflows to it from other BSs either due to BS sleeping, or unavailability of free channels. The following notations are introduced in order to describe the model more systematically.

For each BS $i \in U$ in EFPA, using the superscript E to represent EFPA:

$\alpha_{i,m,n,s}^E$—Traffic offered to i with n overflows from source m and have overflowed sequentially along the path $s=\{s_1, s_2, \ldots s_n\}$ $(m \in \Phi_i; s \subset \Gamma_m, n<n_m)$.

$\alpha_{i,n}^E$—Traffic offered to i with n overflows, namely summing all eligible $\alpha_{i,m,n,s}^E$:

$$a_{i,n}^E = \sum_{m \in \Phi_i; n<_m} \sum_{s \subset \Psi(\Gamma_m-\{i\},n)} a_{i,m,n,s}^E. \quad (5)$$

$A_i^E$—Total combined traffic offered to i, namely:

$$A_i^E = \sum_{n=0}^{\hat{n}_i-1} a_{i,n}^E, \quad (6)$$

where $\hat{n}_i = \max_{m \in} n_m$.

$\upsilon_{s_n,n,m,s}^E$—Overflow traffic from i with n overflows originated from m that have overflowed sequentially along the path $s=\{s_i, s_2, \ldots, s_{n-1}, s_n\}$ $(m \in \Phi_{s_n}, s \subset \Psi(\Gamma_m, n), n \leq n_m,$ if $n=n_m$, the traffic will be cleared out).

$B_i^E$—Probability that all channels in i are busy.

By the Poisson assumption and Erlang B formula, the relationship between $B_i^E$ and $A_i^E$ is defined as:

$$B_i^E = \begin{cases} E(A_i^F, c & \text{for all } i \text{ with } S_i = 1; \\ 1 & \text{for all } i \text{ with } S_i = 0, \end{cases} \quad (7)$$

where $E(A, c)$ is the Erlang B formula where A is the total offered traffic in Erlang and c is the number of channels available.

With the independence assumption of EFPA, the offered traffic $\alpha_{s_n,m,n-1}^E \ldots \{s_n\}$, which has overflowed from n−1 BSs sequentially along the path s, will again overflow from the $s_n$ with probability $B_{s_n}^E$ becoming overflow traffic $\upsilon_{s_n,n,m,s}^E$, so that $$\upsilon_{s_n,n,m,s}^E = \alpha_s = \alpha_{s_n,m,n-1,s-s_n} B_{s_n}^E, \quad (8)$$

The overflow traffic will subsequently be offered to another randomly chosen i in $\Gamma$m-s, namely a BS accessible by calls originated from m and not yet attempted by the overflow call (not in the path s). As there are $n_m$-n BSs in the set $\Gamma$m-s, the overflow traffic will be offered to each BS with probability $$\frac{1}{n_m - n}.$$

Accordingly, $$a_{i,n,m,s}^E = \frac{v_{s_n,n,m,s}^E}{n_m - n} \text{ for } i \in \Gamma_{m-s}. \quad (9)$$

Combining (8) and (9), $\alpha_{i,n,ms}$ and $A_i^E$ may be derived as $$a_{i,n,m,s}^E = \frac{A_m}{n_m} \prod_{j=0}^{n} \frac{B_{s_j}^E}{n_m - j}, \text{ and} \quad (10)$$

$$A_i^E = \sum_{m \in \Phi_i} \frac{A_m}{n_m} \left[1 + \sum_{n=0}^{n_m-1} \sum_{s \subset \Psi(\Gamma_m-\{i\},n)} \prod_{j=1}^{n} \frac{B_{s_j}^E}{n_m - j}\right], \quad (11)$$

respectively.

Together, (7) and (11) constitute a set of fixed-point equations, which can be solved by the successive substitution method. The iteration is continued until the differences between two consecutive results of $B_i^E$ for all $i \in U$ are less than a preset threshold. It follows that the overall blocking $\hat{B}^E$, is given probability of the true model estimated by EFPA, denoted by B by $$\hat{B}^E = 1 - \frac{\sum_{i \in U} A_i^E (1 - B_i)}{A}. \quad (12)$$

the blocking probability of calls from a specific BS may be obtained. Based on the definitions, if the traffic $\alpha_{i,m,n_m-1,s}$ is blocked once again (with the probability $B_i^E$), it will become $\upsilon_{i,m,n_m,s+1}$ and be cleared out of the system as its overflow count reaches $n_m$. Therefore, the blocking probability for calls originated from m can be expressed as:

$$\hat{B}_m^E = \frac{\sum_{s \subset \psi(\Gamma_m,n_m)} v_{s_{n_m},m,n_m,s}^E}{A_m}. \quad (13)$$

Figure 2:
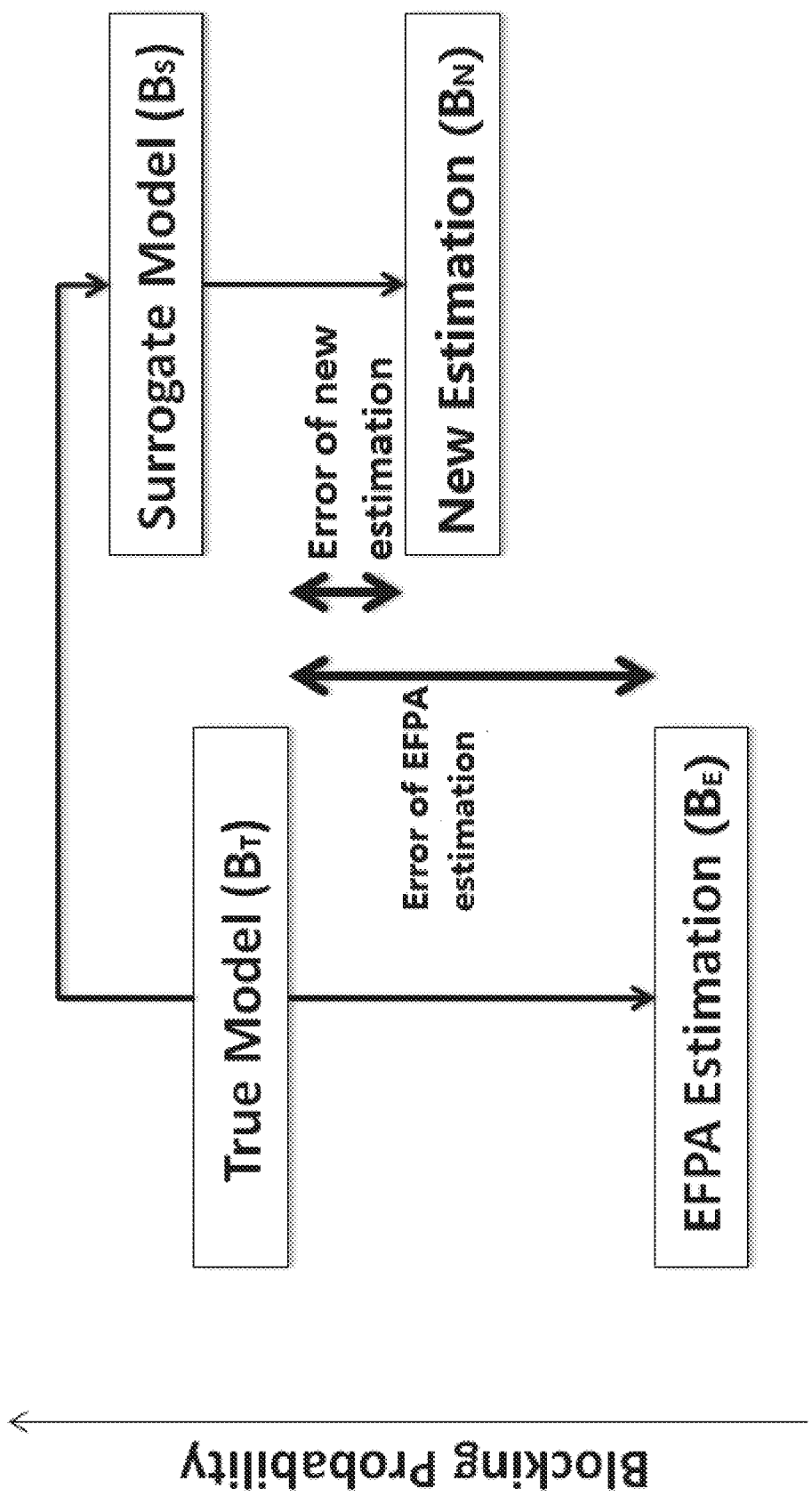
FIG. 2 is an illustration of the blocking probability approximation method based on IESA framework in accordance with an embodiment of the present invention.

With reference to FIG. 2, there is shown an example embodiment of using an IESA framework for blocking probability approximation. The key of IESA framework is applying EFPA, i.e. decoupling the system into independent Erlang B subsystems, to a surrogate model that has similar blocking probability with that of the true model. Doing so preserves the advantages of EFPA such as computational simplicity. Another advantage is that the IESA framework can apply to applications for which EFPA has been used.

Preferably, a surrogate model may be designed to replace the non-hierarchical traffic structure in the true model with a hierarchical traffic structure based on congestion information received by a call when it overflows from one server group to the other. In the case that a call is rejected admission at one BS (server group), due to sleeping or insufficient capacity, the overflow call is proactively made to leave the system with a certain probability, which depends on the system congestion level provided by the information exchange mechanism developed in the surrogate model (to be described in detail later). Such "quitter calls" are proactively made to leave the system without attempting all the remaining accessible BSs. These quitter calls have the attribute that they are very likely to be blocked if they were allowed to overflow and attempt other accessible BSs. As a result, the surrogate model has similar blocking probability to that of the true model, and importantly, it has far less mutual overflow (which is known to adversely affect the accuracy of blocking probability evaluation in EFPA).

On the other hand, as there is a positive probability that one of the skipped-over BSs could have served those quitter calls if they would be allowed to attempt the remaining accessible BSs, the surrogate system will have a higher blocking probability than the true system, namely $B_S > B_T$.

Moreover, proactively giving up overflow traffic leads to a larger proportion of the total traffic offered to a BS formed by new traffic in the surrogate model as compared to the true model, while the proportion formed by overflowed traffic is decreased accordingly. As a result, when an EFPA-based approximation (the "new estimation" as shown in FIG. 2) is applied to the surrogate model, the approximation errors resulted from the Poisson and independence assumptions can be reduced. In this sense, the gap between "new estimation" and "surrogate model" in FIG. 2 is narrower than that between "true model" and "estimation by EFPA" (i.e. $B_S - B_N < B_T - B_E$).

With $B_S > B_T$ and $B_S - B_N < B_T - B_E$, the new estimation will always obtain a higher blocking probability than the EFPA estimation (i.e. $B_N > B_E$). If an appropriate surrogate that has similar blocking probability with that of the true model is chosen so that the positive difference of $B_S$ over $B_T$ is not significant, the new approximation results will be closer to the real blocking probabilities than those by direct application of EFPA (i.e. $|B_T - B_N| < |B_T - B_E|$).

The "new estimation" in FIG. 2 may be considered as IESA. The blocking of the new estimation obtained by IESA is proven to be always between those of exact solution and EFPA, meaning that IESA is at least as good as EFPA in terms of accuracy. Moreover, under critical loading condition, it has been proven that IESA is much more superior to EFPA.

The information exchange mechanism in the surrogate model for IESA, which entails the third attribute while retaining the first two attributes, was originally introduced in order to improve the accuracy of approximations in partially accessible overflow loss systems. The surrogate for IESA-CN is an adaptation to mobile cellular networks of the original IESA. In particular, IESA-CN includes modeling of locality and mobility that are unique features of cellular networks.

Preferably, the base station operating in the sleep mode is arranged to overflow the service request reaching the respective base station to a surrogate base station of the plurality of nearby base stations, wherein the surrogate base station is operating in the active mode.

The surrogate for IESA-CN is described as follows. A new call just initiated has $\Delta = \emptyset$ and $\Omega = 0$. When call $\zeta$ originated from BS m with attributes I$\lambda$, $\Delta\zeta$, $\Omega\zeta$ arrives at i, it will be admitted if the BS still has vacant channels available. Otherwise, if the most senior call $\kappa$ in service has $\Omega\kappa < \Omega\zeta$, the incoming call $\zeta$ will overflow to one of the BSs in $\Gamma$m-i and its attributes become $\{I\zeta, \Delta\zeta \cup i, \Omega\zeta+1\}$. However, if $\Omega\kappa \geq \Omega\zeta$, call $\kappa$ and call $\zeta$ will exchange their third attribute, $\Omega$, before call $\zeta$'s overflow. In this way, the overflow call will have attributes $\{I\zeta, \Delta\zeta \cup i, \Omega\kappa+1\}$ and the call in service will have $\{I\kappa, \Delta\kappa, \Omega\zeta\}$.

Alternatively, the base station operating in the active mode is arranged to handover the service request being processed by the respective base station to a surrogate base station of the plurality of nearby base stations, wherein the surrogate base station is operating in the active mode.

For a handover call $\zeta$ the attributes $\Delta\zeta$ and $\Omega\zeta$ are reset to $\emptyset$ and 0, respectively upon a handover. This is because the original congestion information becomes irrelevant as the set of BSs that it can access also changes upon a handover. The reset mechanism may not exist in the original IESA. The additional attribute $\Omega$ represents an estimate of the number of busy BSs in the network. For every call, $|\Delta| \leq \Omega$ because that the number of BSs that the call has already attempted (and overflowed from) is a lower bound for the estimate of the number of BSs that are busy in the network. In this way, an overflow call retains its identity (I) and actual overflow record ($\Delta$) while gathering network congestion information ($\Omega$) from other calls.

A special mechanism may be introduced in IESA-CN to approximate the probability that all of the unattempted accessible BSs are not available. The mechanism uses the values of $\Delta$ and $\Omega$ of an overflow call. In the event that all of the unattempted BSs are presumed unavailable, the call will give up attempting the remaining BSs and will immediately be cleared out of the system. $P_{k^*,|\Delta\zeta|,\Omega\zeta}$ may be defined as the probability of a call $\zeta$ with the attributes $\{I\zeta, \Delta\zeta, \Omega\zeta\}$ gives up attempting in a system with parameter $k^*$. The parameter $k^*$ is by definition the maximum allowable value of the attribute $\Omega$ of any call in the surrogate model and is a measure of the level of dependency in the real system ($k^* \leq n_i$ as $\Omega \leq |\Delta|$ at all times). $P_{k^*,|\Delta\zeta|,\Omega\zeta}$ is evaluated as:

$$P_{k^*,|\Delta|,\Omega} = \begin{cases} 0 & \text{if } \Omega < n_i; \\ \dfrac{\binom{\Omega - |\Delta|}{n_i - |\Delta|}}{\binom{k^* - |\Delta|}{n_i - |\Delta|}} & \text{if } \Omega \geq n_i, \end{cases} \quad (14)$$

where $|\Delta| \leq n_i \leq k^*$. From (14), one can infer that a call with a given value of attribute $\Omega$ is more unlikely to be blocked if the value of $k^*$ is higher.

As the approximation results are affected by the design of the surrogate model, choosing an appropriate value of parameter $k^*$ which can correctly reflect the level of dependency in the network and the ability to spread out congestion information is therefore crucial for the accuracy of the approximation under IESA-CN. A handover in cellular networks is generally considered an independent event as the sojourn time of a call in each cell/BS is often assumed to be exponentially distributed.

This is also one of the reasons that to reset the call attributes $\Omega$ and $\Delta$ upon a handover. Overflows, however, cause state dependencies among nearby BSs and the ability to spread out congestion will affect those dependencies. On the other hand, this ability to spread out congestion depends on the degree of traffic overflow, which in turn depends on both traffic offered to each BS and on the mobility of the calls.

More specifically, heavy traffic leads to more overflows and handovers, hence making congestion (as well as congestion information) easier to spread out around the network. As a result, a larger k* value may be required. Similarly, higher mobility of calls (higher handover rate) indicates more handovers during a call's lifetime, and as a result also requires a larger k* as well. This expectation is confirmed by numerical experiments as discussed later in this disclosure.

Note that in previous work on approximations in VoD systems under the original IESA, k* is a constant equal to the total number of server groups. Therefore, the level of statistical dependency in such systems is rather fixed, and can be represented by a constant value of k*. However, due to the locality and mobility features in cellular networks, it is required to choose an appropriate value of k* in IESA-CN for specific network conditions.

According to the two features described above, mobility may dominate over locality. If a cellular network without any handover is considered, the behavior of the system may be similar to a VoD system where the value of k* is a constant for IESA. In such scenarios, the optimal k* value may be around the number of BSs within two hops distance as overflow alone (without handover) is unlikely to spread the congestion information beyond that scope.

However, if handovers exist, choosing an appropriate k* value is crucial for designing a surrogate that can lead to accurate estimations of blocking probabilities. Regression analysis may be used to forecast the quasi-optimal k*. The dependent variable is k*, while the independent variables include the handover rate δ and the average offered traffic per active channel $a_{avg}$.

Based on the above, the quasi-optimal value of k* for different values of $a_{avg}$ and δ may be obtained as follows. For a particular cellular network model, a small set of independent cases with symmetric distribution of traffic offered to every BS can be used as the training set for prediction. The training and predicting processes can be done by, for example, the curve fitting toolbox of MATLAB or any suitable analyzer applications.

IESA-CN algorithm may be used, and together with those predicted values of k* in order to estimate the blocking probability for the general cases with arbitrary distribution of offered traffic. Machine learning technique may require running simulations to obtain blocking probabilities for the training set. However, considering the difference in computational efficiency between approximation and simulation, this method is still much more computationally efficient than obtaining blocking probabilities by simulation for every possible set of system parameters.

For IESA-CN, using the superscript I to represent IESA-CN, the following expressions are defined:

$\alpha_{i,m,j,n,\alpha}^{I}$—Traffic offered to BS i with n overflows ($|\Delta|=n$) and $\Omega=j$ from source m and have overflowed sequentially along the path $s=s_1, s_2, \ldots s_n$ ($m \in \Phi_i$; $s \subset \Gamma_m$; $n<n_m$; $j=0, 1, \ldots, k*-1$).

$\alpha_{i,j,n}^{I}$—Traffic offered to i with n overflows and $\Omega=j$, namely summing all eligible $\alpha_{i,m,j,n,s}^{I}$:

$$a_{i,j,n}^{I} = \sum_{m \in \Phi_i; n < n_m} \sum_{s \subset \psi(\Gamma_m-\{i\},n)} a_{i,n,j,m,s}^{I}. \quad (15)$$

$\alpha_{i,j,n}^{I}$—Traffic offered to i with n overflows ($|\Delta|=n$) and $\Omega$ up to j, namely $$\hat{a}_{i,n,j}^{I} = \sum_{l=n}^{j} a_{i,n,j}^{I}. \quad (16)$$

$A_{i,j}$—Total combined traffic offered to i up to level j, namely $$A_{i,j}^{I} = \sum_{l=0}^{j} a_{i,l}^{I}. \quad (17)$$

$\upsilon_{i,n,j,m,s}^{I}$—Overflow traffic from i with n overflows and $\Omega=j$ originated from m that have overflowed sequentially along the path $s=s_1, s_2, \ldots, s_{n-1}$, i ($m \in \Phi_i$, $s \subset \Psi(\Gamma_m, n)$, $n \le n_m$; $n \le j \le k*$).

$z_{s_n, n,j,m,s}^{I}$—Blocked traffic (due to the special giving up mechanism in IESA-CN) from i with n overflows and $\Omega=j$ originated from m that have overflowed sequentially along the path $s=s_1, s_2, \ldots, s_{n-1}, s_n$ ($m \subset \Phi_i$, $s \subset \Psi(\Gamma_m, n)$, $n \le n_m$; $j \le k*$).

$B_{i,j}$—Probability that all channels in i are busy at level j serving calls with $|\Delta| \le \min(j, \hat{n}_i-1)$ and $|\Delta| \le \Psi < j$.

By definition, for $A_{i,j}^{I} = A_{i,j-1}^{I} + \sum_{n=0}^{min(j,n,m)} \alpha_{i,j}^{I}$ for $j=1, 2, \ldots, k*-1$ with initial values $A_{i,0}^{I} = \alpha_{i,0,0}^{I} = A_i$.

Also by the Erlang B formula, the relationship between $B_{i,j}^{I}$ and $A_{i,j}^{I}$ at each level j may be determined as $$B_{i,j}^{I} = \begin{cases} E(A_{i,j}^{I}, c_i) & \text{for all } i \text{ with } S_i = 1; \\ 1 & \text{for all } i \text{ with } S_i = 0, \end{cases} \quad (18)$$

where $0 \le j \le k*$.

The origin of overflow traffic $\upsilon_{s_n}^{n,j,m,s}$ for two scenarios may be analyzed. Firstly, with probability $B_{s_n,j-1} - B_{s_n,j-2}$, all channels of $s_n$ at level $j-1$ are not available. Equivalently, all channels are serving calls with seniority up to $\Omega=j-1$. In this scenario, the traffic $\alpha_{s_n,n-1,j-2,m,s-\{s_n\}}$ with $\Omega \le j-2$ offered to $s_n$ will overflow with information exchange (with the most senior call with $\Omega=j-1$) and thus forms the overflow traffic $\upsilon_{s_n,n,j,m,s}^{I}$. On the other hand, with probability $B_{s_n,j-1}^{I}$, all channels of $s_n$ at level $j-1$ are busy serving calls with $\Omega \le j-1$. In this scenario, the offered traffic $\alpha_{s_n, n-1,j-1, m, s-\{s_n\}}^{I}$ to $s_n$ simply overflow without information exchange and also contributes to the overflow traffic $\upsilon_{s_n,n,j,m,s}^{I}$. Thus, for $j=1, 2, \ldots, k*$. $\upsilon_{s_n,n,j,m,s}$ may be derived as:

$$v_{s_n,n,j,m,s}^{I} = \hat{a}_{s_n,n-1,j-2,m,s-\{s_n\}}^{I}(B_{s_n,j-1}^{I} - B_{s_n,j-2}^{I}) + \quad (19)$$

$$a_{s_n,n-1,j-1,m,s-\{s_n\}}^{I} B_{s_n,j-1}^{I}$$

$$= \hat{a}_{s_n,n-1,j-1,m,s-\{s_n\}}^{I} B_{s_n,j-1}^{I} - \hat{a}_{s_n,n-1,j-2,m,s-\{s_n\}}^{I}$$

$$B_{s_n,j-2}^{I}.$$

Referring back to (14), with a probability of $P_{k*,n,j}$, the overflow traffic $\upsilon_{s_n, n,j,m,s}^{I}$ is prevented from further hunting for available BSs even if it has not yet attempted all BSs in $\Gamma_m$. On the other hand, if the overflow traffic has $|\Delta|=n_m$, i.e., has already attempted all accessible BSs in $\Gamma_m$, or the exchanged information indicates that no BSs is possibly available ($\Omega=k*$), the probability $P_{k*,n_m,j}$ will be equal to 1. This ensures that calls with $|\Delta|=n_m$ or $\Omega=k*$ are always immediately cleared out. As defined previously, traffic blocked in this manner will become $z_{s_n,n,j,m,s}^I$, namely $$z_{s_n,n,j,m,s}^I = \upsilon_{z_n,n,j,m,s}^I P_{k^*,n,j}. \tag{20}$$

On the other hand, with probability $1-P_{k^*,n,j}$, the overflow traffic $\upsilon_{s_n,n,j,m,s}^I$ will continue to attempt another BS in $\Gamma_m$-s as in EFPA. Every $i \in \Gamma_m$-s will be chosen with probability $$\frac{1}{n_m - 1}.$$

Accordingly, $$a_{i,n,j,m,s}^I = \frac{\upsilon_{s_n,n,j,m,s}^I (1 - P_{k^*,n,j})}{n_m - n}. \tag{21}$$

$A_{i,j}^I$ and $B_{i,j}^I$ may then be obtained at each level iteratively based on (16), (17) and (21).

The traffic offered to the highest level of the system, namely level $k^*-1$, is the total offered traffic as it includes all the levels below. Therefore, $A_{i,k^*-1}^I(1-B_{i,k^*-1}^I)$ is the total carried traffic by i. The system blocking probability can thus be measured by 1 minus the ratio of carried traffic to the offered traffic. Thus the system blocking probability may be derived by IESA-CN as:

$$\hat{B}^I = 1 - \frac{\sum_{i \in U} A_{i,k^*-1}^I (1 - B_{i,k^*-1}^I)}{A}. \tag{22}$$

The blocking probability for calls originated from BS m can be calculated by summing all together, namely $$\hat{B}_m^I = \sum_{n=0}^{n_m} \sum_{s \subset \Phi(\Gamma_m,n)} \sum_{j=n_m}^{k^*} z_{s_{n_m},m,j,n_m,s}^I. \tag{23}$$

Note that both (12) and (22) does not take the mobility effect into account. A set of fixed-point equations may be obtained by combining (2), (3) and an equation to calculate $\hat{B}$ in terms of $A_i$ for each method, namely, (12) for EFPA and (22) for IESA-CN, to calculate the blocking probability with consideration of the mobility effect.

The above embodiments may be advantageous in that the present invention provides a surrogate for cellular networks with BS sleeping, and derive an accurate approximation of blocking probability of the surrogate under the IESA framework. Advantageously, the locality and mobility features uniquely present in cellular networks can be addressed by means of a single parameter already available in the original IESA framework. The fact that adjusting a single parameter can adapt the original approximation under the IESA framework to a different network model illustrates the flexibility and versatility of the IESA framework for estimating the blocking probability of various overflow loss systems.

With simulation results as the benchmark, it can be shown that IESA-CN is a significantly more accurate approximation than EFPA and may be applied for evaluating blocking probabilities in cellular networks with BS sleeping in a wide range of scenarios. IESA-CN, like EFPA, decouples the system into independent subsystems loaded with Poisson traffic (e.g., Erlang B subsystems), which makes both methods computationally efficient. On the other hand, IESA-CN introduces an information exchange mechanism, which can capture traffic dependence in the system, and hence it can significantly improve the accuracy over EFPA.

The inventors have performed experiments for evaluating the performances of an existing cellular network infrastructure in accordance with the embodiments of the present invention.

Figure 3:
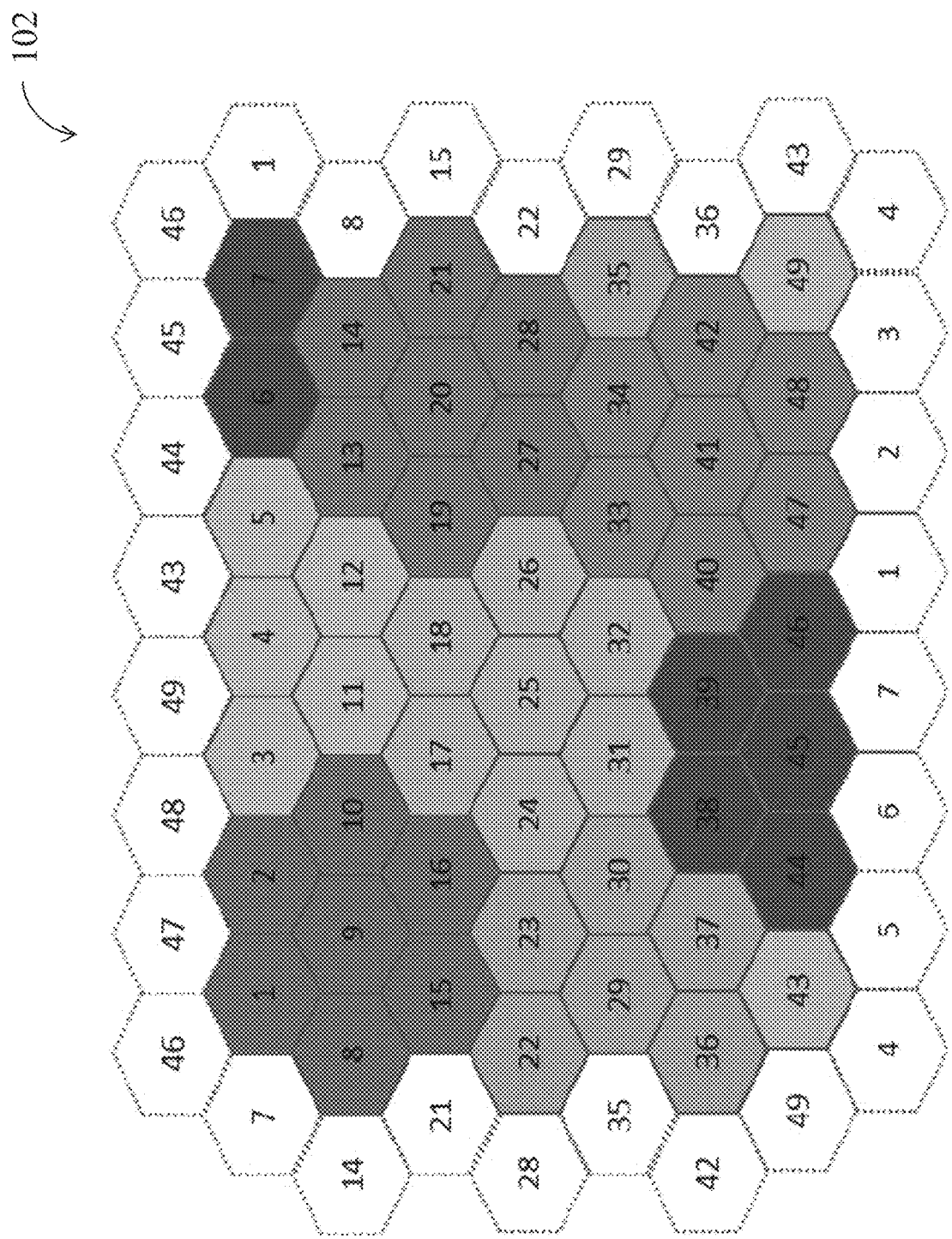
FIG. 3 is an illustration of a 49-cell hexagonal configuration network model with wrapped-around design.

Numerical results obtained based on the methods in the abovementioned embodiments demonstrate the accuracy, versatility, and computational efficiency of IESA framework. Referring to FIG. 3, a cellular network model with 49 interconnected and wrapped-around hexagonal cells was evaluated, in which each cell is served by a single BS.

The wrapped-around design avoids boundary effect in cellular network evaluation. Assuming that each BS has 10 channels, a Markov Chain for the model would have a state space of 1049, which is computationally prohibitive.

The inventors have conducted extensive numerical experiments under a wide range of system parameters. The approximation results by IESA-CN and EFPA were compared with simulation results serving as a benchmark, which were obtained by MATLAB in the form of an observed mean from multiple independent runs. Simulation results were used as the benchmark as no exact analytical results are available for the models.

The confidence intervals were at the 95% level based on the Student's t-distribution. Markov chain simulation was used for the cases where both service time and sojourn time were exponentially distributed, while discrete event simulation was used for the other cases. The error between the approximation and the simulation in terms of the relative error was calculated. Given an approximation result r and a simulation result s, the relative error was (r−s)/s. Note that the choice here of a linear scale for the relative difference was made for convenience of illustration. Other relevant alternatives such as log scale may also be acceptable for assessing the errors.

For simplicity without loss of generality, with reference to FIGS. 4A to 4D, four different BS sleeping patterns based on the 7-cell cluster were considered. The 49-cell network model (FIG. 3) can be decomposed into 7 identical 7-cell clusters. Each pattern switches different number of BSs in a cluster to sleep mode.

With reference to FIGS. 4A to 4D, a dark cell indicates that the BS serving the cell is in sleep mode, while a light cell denotes that the BS is active mode. All patterns have at least one active BS next to a BS in sleep mode, which ensures that traffic arriving at any sleeping BS could be served by a neighboring active BS.

In these experiments, fixed sleeping schemes were considered to compare the performance of EFPA and IESA-CN in approximating the blocking probability. This case may be extended to a dynamic case if the time spent under each sleeping scheme is sufficiently long. The long time duration of being in a given sleeping scheme can be justified by practical considerations associated with transition time requirements for BSs to switch between active and sleep modes. Then, an approximation for the overall blocking probability can be obtained by a weighted average of the individual cases.

The methods may be applied to cellular network models with general (i.e., asymmetric or unbalanced) distribution of offered traffic. In one example, one of seven clusters in the 49-cell model is referred as the "hot" cluster. The BSs in the hot cluster may be offered heavier traffic than the rest of the network.

$A_n$ may be denoted as the traffic offered to each BS not in the hot cluster, and a as the ratio of traffic offered to each BS in the hot cluster to traffic offered to each BS outside the hot cluster. The traffic offered to each BS in the hot cluster is thus $\alpha A_n$.

Figure 4B:
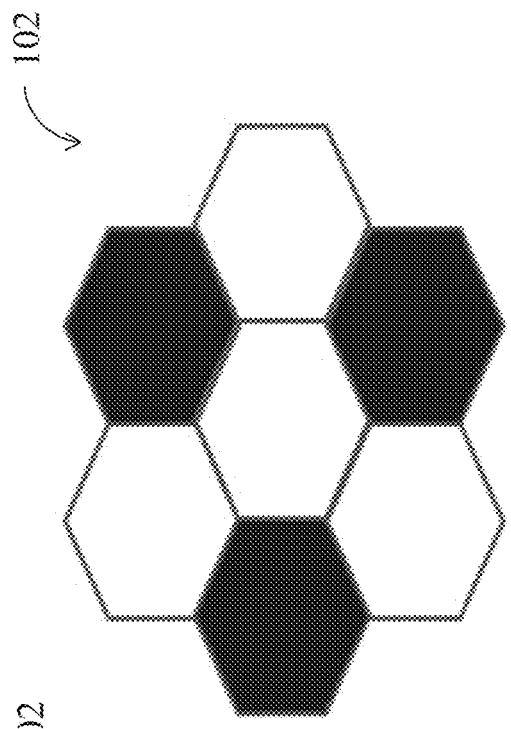
FIGS. 4A, 4B, 4C and 4D illustrate groups of BS operating in different sleeping patterns.
Figure 4A:
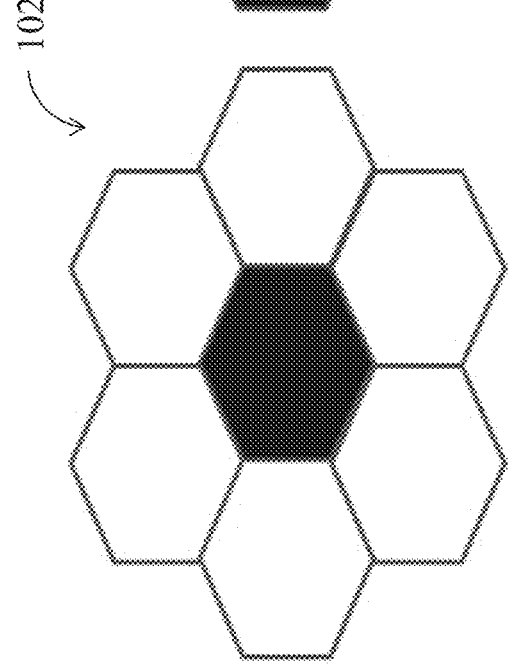
Figure 4D:
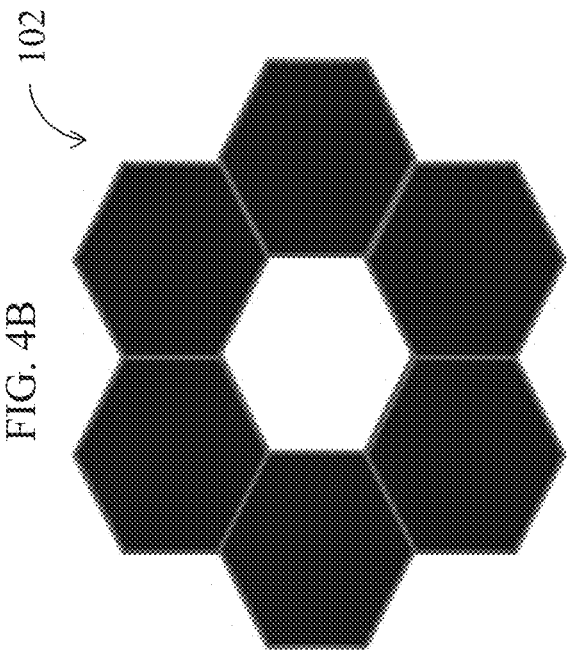
Figure 4C:
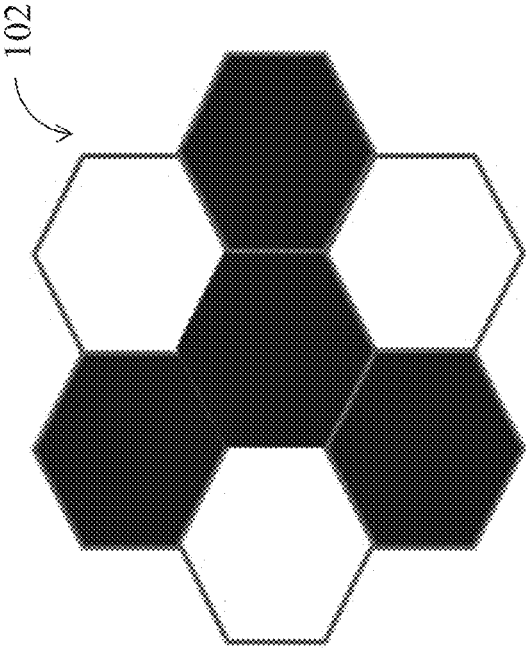

Note that the policy as shown in FIG. 4D (6 out of 7 BSs are in sleep mode) will simplify the 49-cell system to seven isolated clusters, because a call arriving at a BS in sleep mode has only one active BS to overflow to. Therefore, in this case, the approximation results of EFPA and IESA-CN are identical as the information exchange mechanism cannot be activated for the IES surrogate.

Power consumption of a base station may comprise of two parts, namely traffic load dependent power consumption such as power amplifiers, and static power consumption such as air conditioning which is consumed as long as the BS is active.

Moreover, if a BS extends its coverage to serve customers originally associated with another BS that has been switched to sleep mode, it will consume more power to serve the users that are relatively far away due to the path-loss effect. Following the discussions above, the power consumption of a BS is given by $$P_{BS} = \begin{cases} P_{static} + \tau P_\upsilon^{max} + \hat{\tau}\hat{P}_\upsilon^{max} & \text{when active,} \\ P_{sleep} & \text{when sleeping,} \end{cases} \quad (24)$$

where $\tau$ and $\hat{\tau}$ are the loading of local traffic and traffic transferred from neighboring sleeping BSs, respectively. $P_{static}$ represents static power consumption, $\tau P_\upsilon^{max}$ represents traffic load dependent power consumption attributed to local traffic, and $\hat{\tau}\hat{P}_\upsilon^{max}$ represents variable power consumption attributed to transferred traffic from sleeping BSs. The exact difference between $\hat{P}_\upsilon^{max}$ and $P_\upsilon^{max}$ depends on various factors such as the path-loss exponent, inter-distance of BSs and distribution of user locations.

Figure 5:
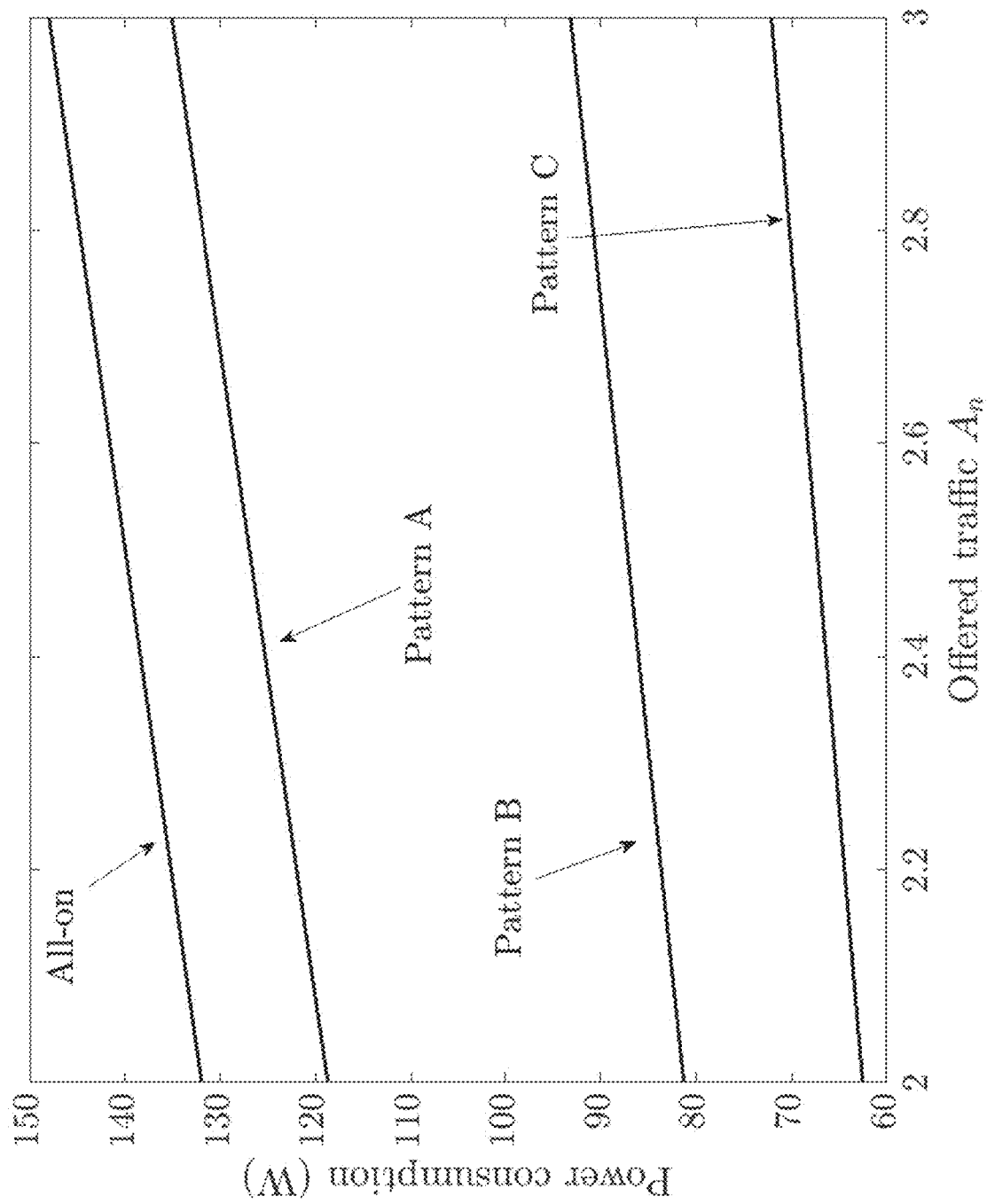
FIG. 5 is a plot showing average power consumptions achievable for different switching patterns.

Assume that $P_{sleep}=1$ W, $P_{static}=100$ W, $P_\upsilon^{max}=160$ W and $\hat{P}_\upsilon^{max}=190$ W, average power consumptions of Patterns A, B and C and the case where all BSs are kept active are depicted in FIG. 5. When offered traffic per BS is 2 to Erlangs as shown in the figure, up to 50% power consumption can be saved if Pattern C is chosen. Meanwhile, all three patterns (A, B and C) can maintain the blocking probability below $10^{-2}$, which may be an acceptable level for cellular networks.

The inventors also examined the sensitivity of the blocking probability to the service or sojourn time distributions. To this end, three distributions, namely, exponential (an example assumption for cellular networks, with a variance of 1.0), deterministic and hyperexponential (with variances of 1.2 and 2.0) distributions were considered.

Figure 6A:
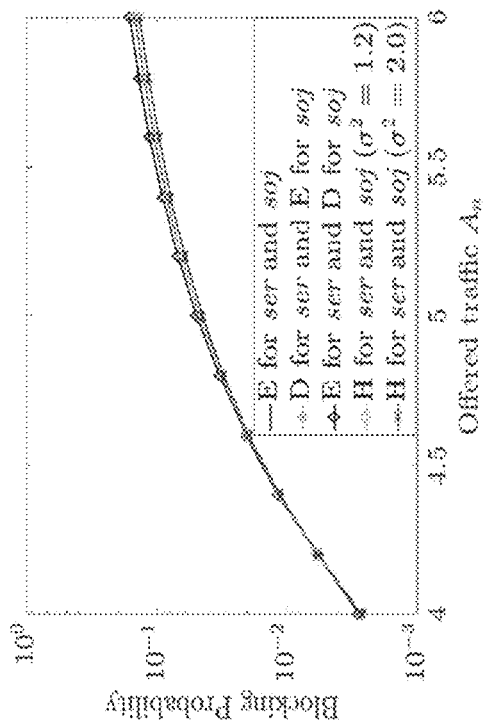
FIGS. 6A, 6B, and 6C are plots showing simulation results of blocking probabilities with different distributions of service time (ser) and sojourn time (soj) for different switching patterns of FIGS. 4A to 4C respectively, wherein D, E, and H represent deterministic, exponential and hyper-exponential distributions respectively ($\mu=1$, $\delta=1$, $\alpha=1.2$)
Figure 6B:
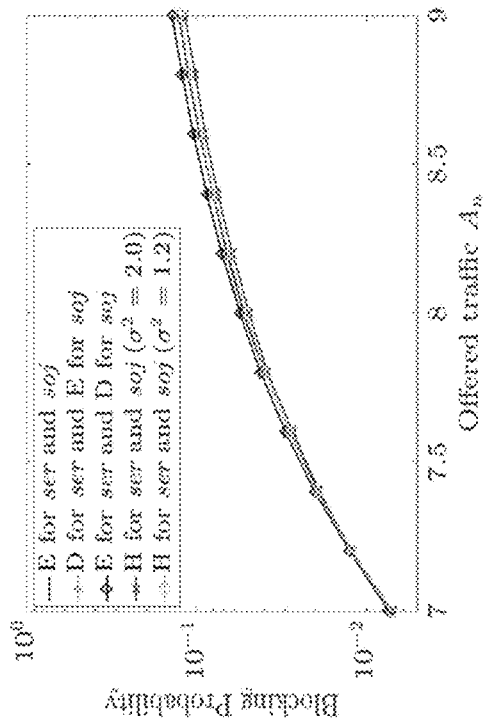
Figure 6C:
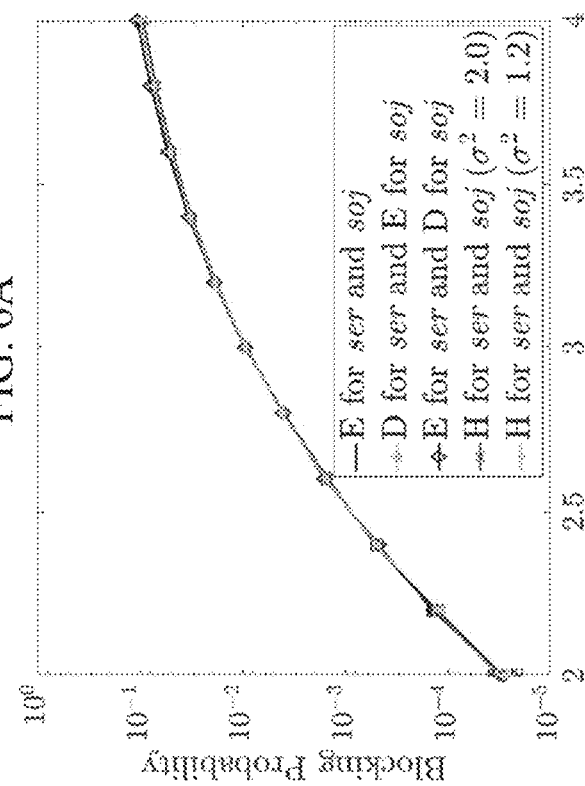

With reference to FIG. 6, the blocking probabilities are nearly insensitive to the shape of the distributions of either service or sojourn time. This suggests that the approximation method may be applied to systems with non-exponential distribution of service and sojourn time.

Figure 7:
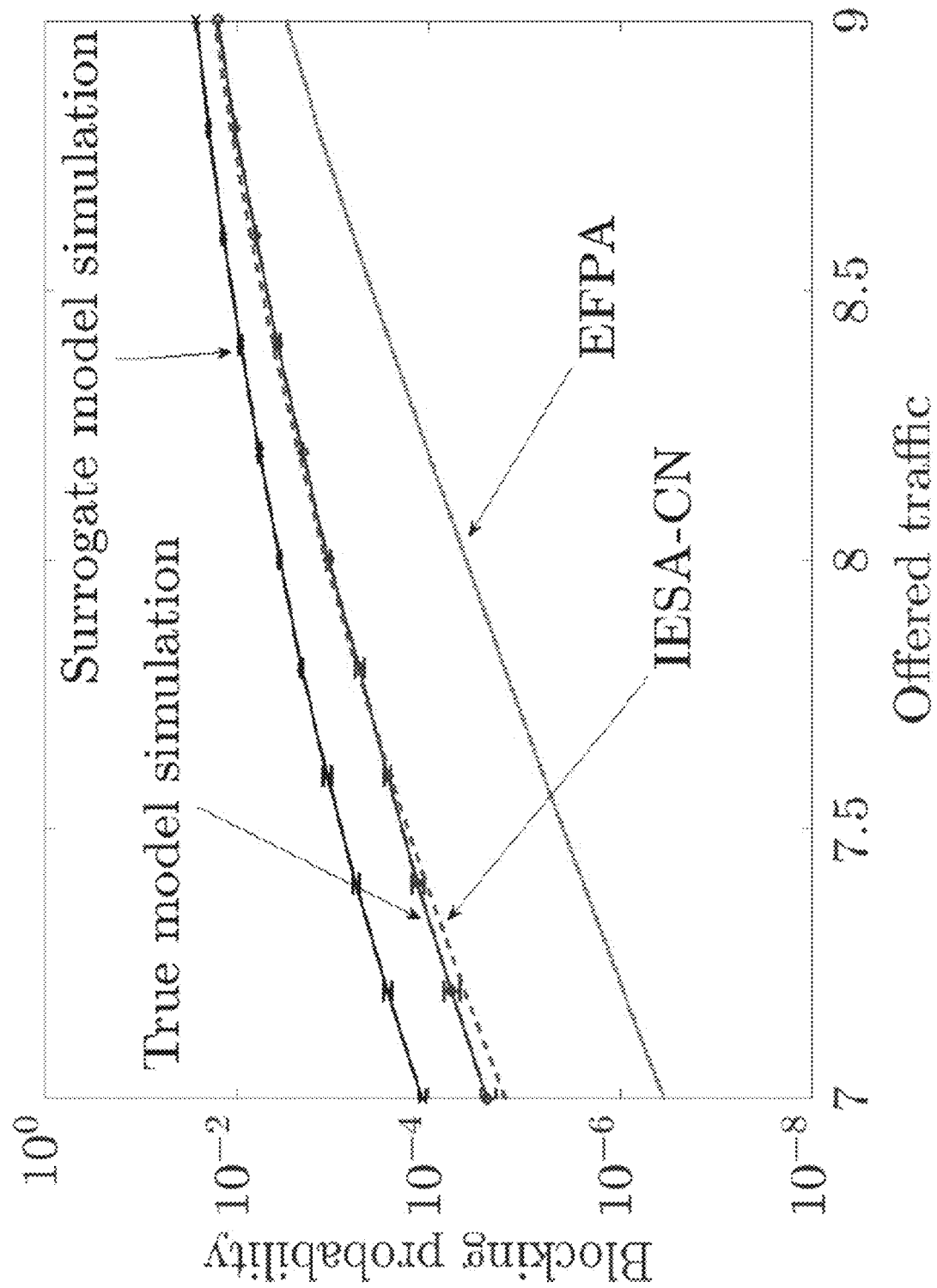
FIG. 7 is a plot showing simulation and approximation results for true and surrogate models ($\mu=1$, $\delta=0$, $\alpha=1$)

With reference to FIG. 7, it is shown that the blocking probabilities of the true and surrogate models obtained by simulation as well as approximation results obtained by EFPA and IESA-CN, respectively. The results confirm the example of FIG. 2 discuss earlier. The surrogate model has relatively higher blocking probability than the true model while the approximations underestimate the blocking probabilities. These two effects appear to compensate each other.

Therefore, as shown in the figure, IESA-CN reduces the approximation error as compared to the EFPA. With reference to FIG. 6, "True model Simulation" and "Surrogate model simulation" were distinguished from each other. Numerical support is provided for the conceptual illustration, so the simulation results for the surrogate model are only provided in FIG. 7. In all other figures, the term "simulation" refers to the simulation results of the true model.

Figure 8A:
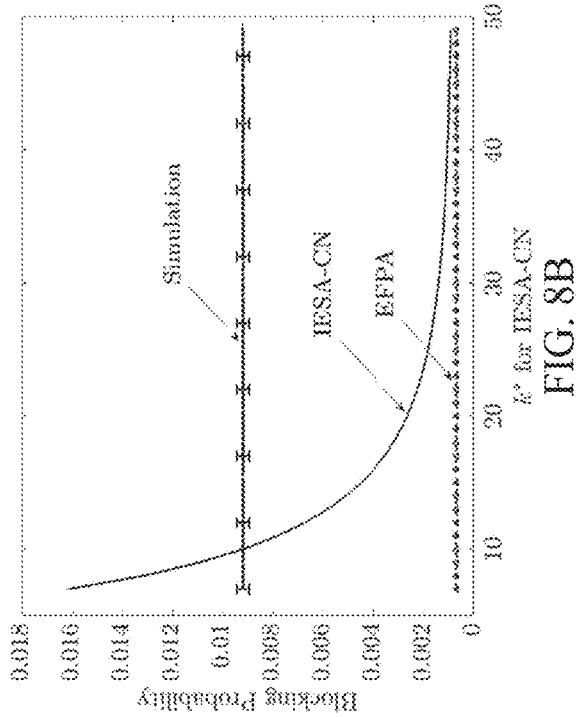
FIGS. 8A, 8B, and 8C are plots showing different results resulting from choices of the parameter k* in IESA-CN ($\mu=1$, $\alpha=1$)
Figure 8B:
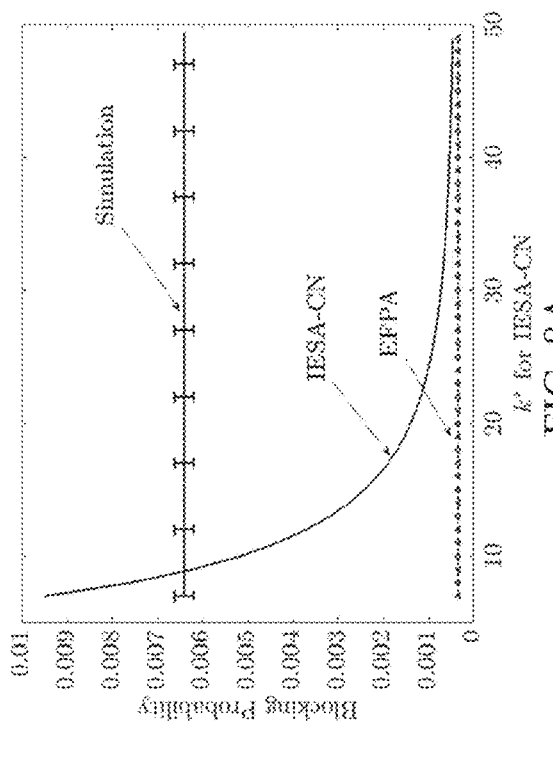
Figure 8C:
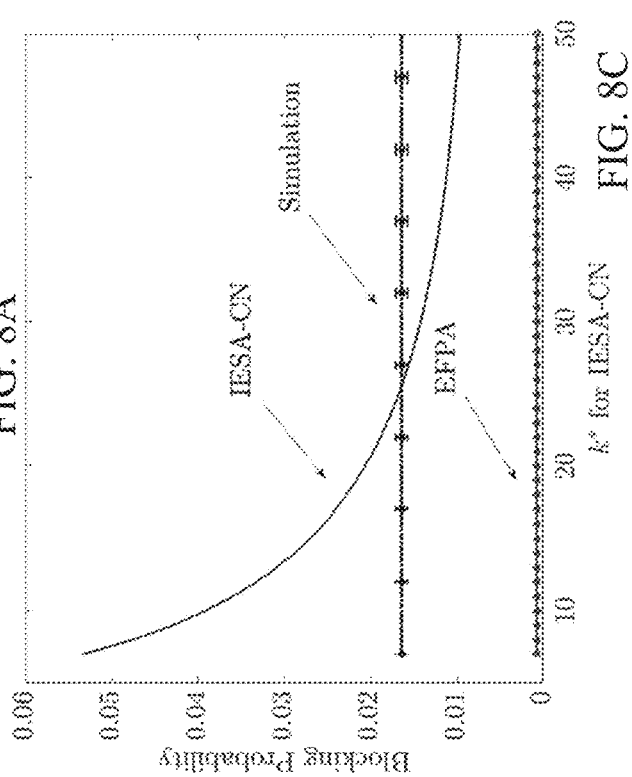

As discussed earlier, the optimal value of the parameter k* in IESA-CN, which may be an estimate of the maximum number of BSs that a call has access to, may be influenced by the handover rate in the network. With reference to FIG. 8A to 8C, the different relationship between k* value and the approximation results for $A_n=8$, $\delta=0$, for $A_n=8$, $\delta=1$ and for $A_n=9$, $\delta=1$ are illustrated respectively, in the 49-cell model with all BSs active.

Accordingly, the inverse relationship between k* and approximated blocking probability is consistent with Eqn. (14). As the handover rate or offered traffic increases, the number of BSs that a call is expected to visit is likely to increase. In line with an expectation that the network congestion may be easier to occur and to spread out to the entire network if a typical call visits more cells during its lifetime, the k* value that gives the most accurate estimation result also increases from 9 in FIG. 8A to 11 in FIG. 8B and 25 in FIG. 8C.

Meanwhile, as the value of k* increases, the approximation result by IESA-CN approaches that by EFPA. The intuitive explanation is that when k* is large, the giving up probability obtained by Eqn. (14) approaches zero. Without the giving up mechanism, the surrogate model is the same as the true model and thus the approximation results by applying IESA-CN and EFPA are identical.

Figure 9A:
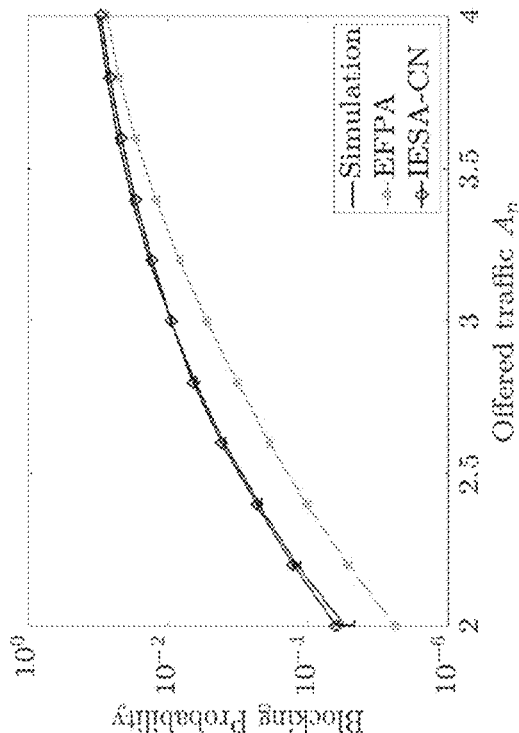
FIGS. 9A, 9B, and 9C are plots showing different simulation and approximation results of system blocking probabilities with different offered traffic $A_n$ for different switching patterns of FIGS. 4A, 4C and 4D respectively ($\mu=1$, $\delta=1$, $\alpha=1.2$)
Figure 9B:
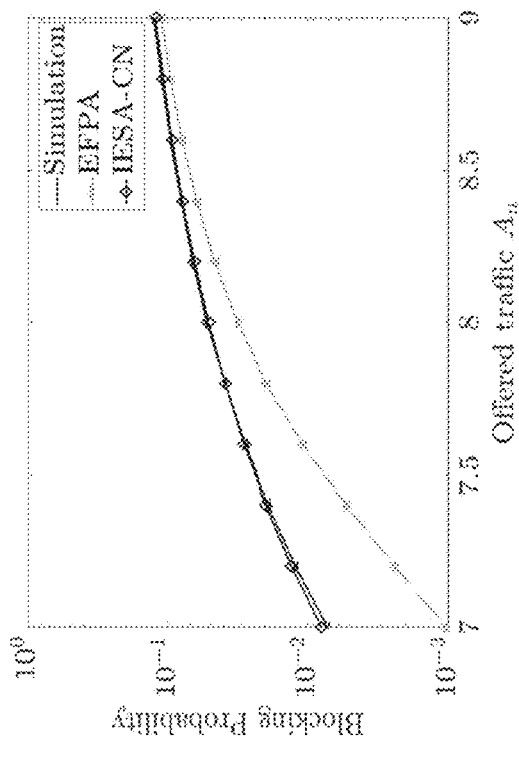

With reference to FIGS. 9 to 12, there is shown the sensitivity of accuracy of EFPA and IESA-CN to input parameters including arrival rate λ, handover rate δ and level of asymmetrical traffic distribution α. The curve "simulation" in FIG. 9 represents the simulation results of the true model (corresponding to the "true model simulation" curve in FIG. 7) and is the benchmark for assessing the relative errors in FIGS. 10 to 12.

With reference to these results, a consistency with the discussion earlier is observed. EFPA significantly underestimates blocking probabilities in most cases due to the Poisson and independent assumptions, while IESA-CN significantly improves the accuracy of approximations for Patterns A, B and C respectively illustrated in FIGS. 4A, 4B and 4C. In addition, IESA-CN may provide a conservative estimation as it gives blocking probabilities that are higher than actual values, which is preferable and often adopted for the purpose of network design.

Figure 9C:
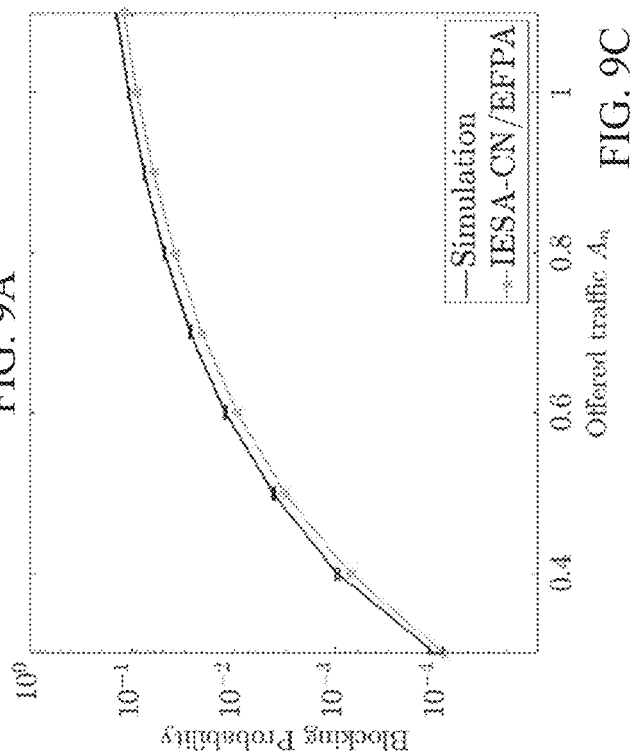
Figure 10A:
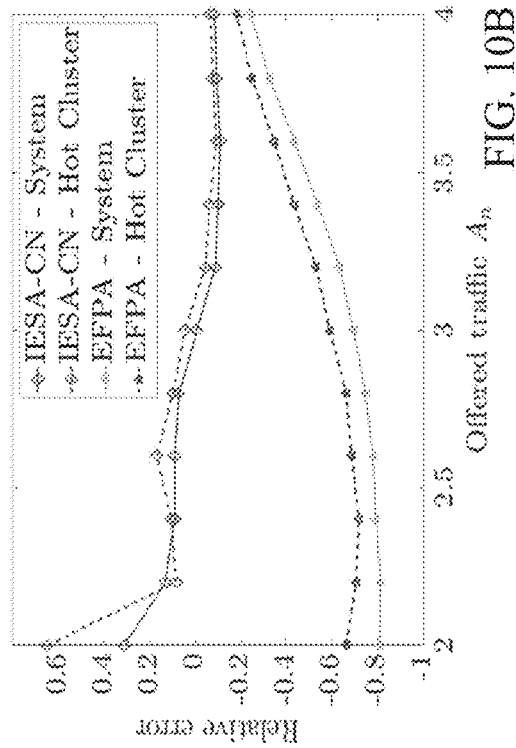
FIGS. 10A, 10B, and 10C are plots showing different results of relative errors of blocking probabilities with different offered traffic for different switching patterns of FIGS. 4A, 4C and 4D respectively ($\mu=1$, $\delta=1$, $\alpha=1.2$)
Figure 10B:
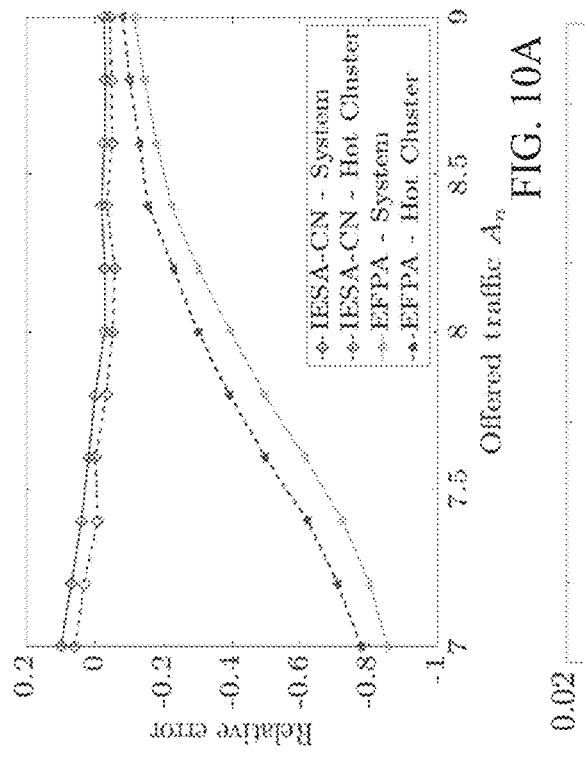
Figure 10C:
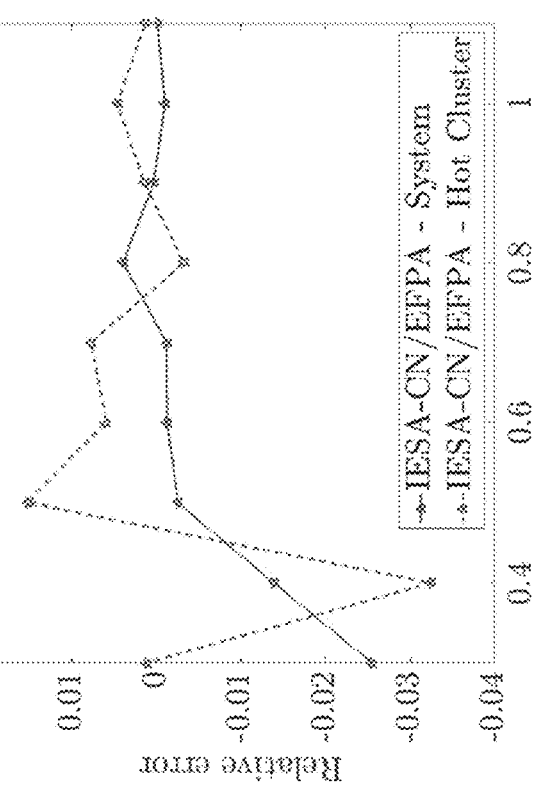
Figure 11A:
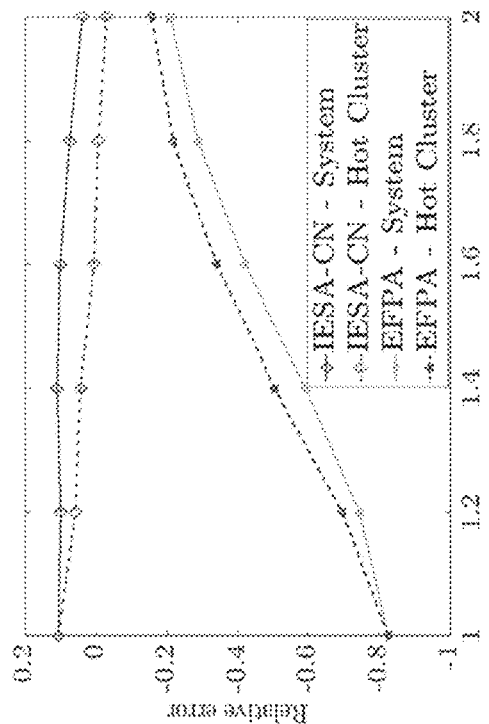
FIGS. 11A, 11B, and 11C are plots showing different results of relative errors of blocking probability approximations with different levels of asymmetric traffic distribution for an all-on pattern and different switching patterns of FIGS. 4A and 4C respectively ($\mu=1$, $\delta=1$)
Figure 11B:
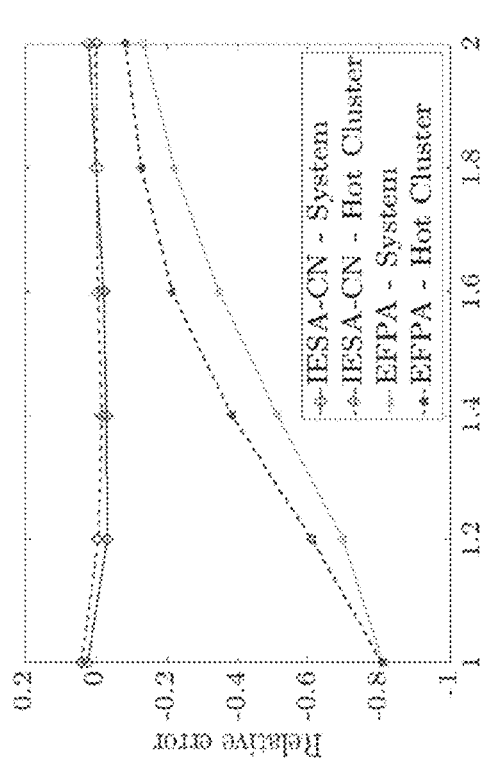
Figure 11C:
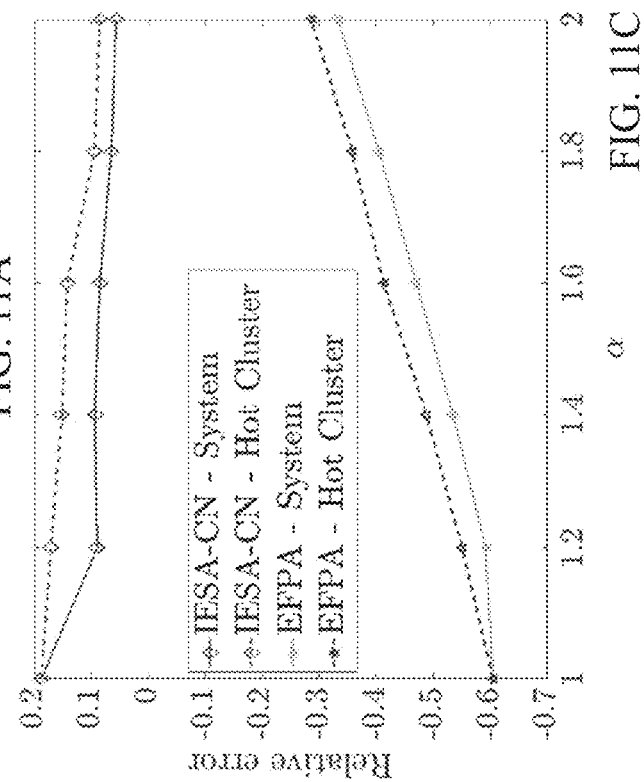
Figure 12A:
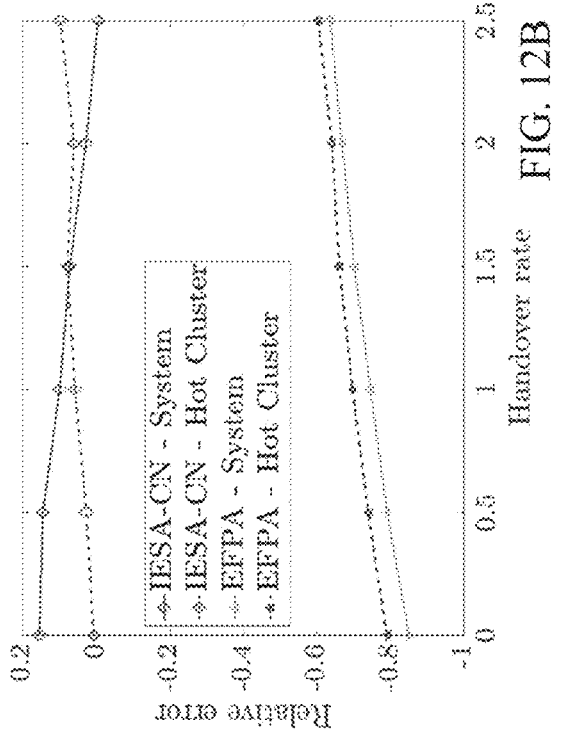
FIGS. 12A, 12B, and 12C plots showing different results of relative errors of blocking probability approximations with different handover rates for an all-on pattern and different switching patterns of FIGS. 4A and 4C respectively ($\mu=1$, $\alpha=1.2$)
Figure 12B:
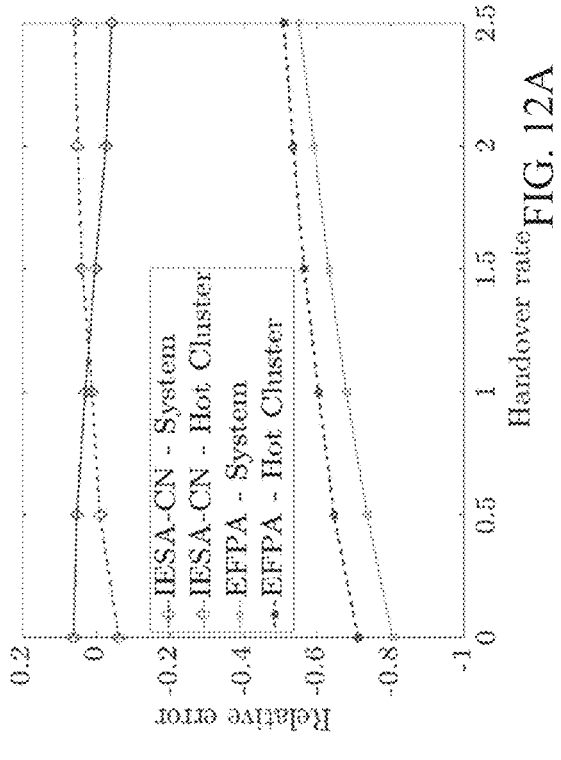
Figure 12C:
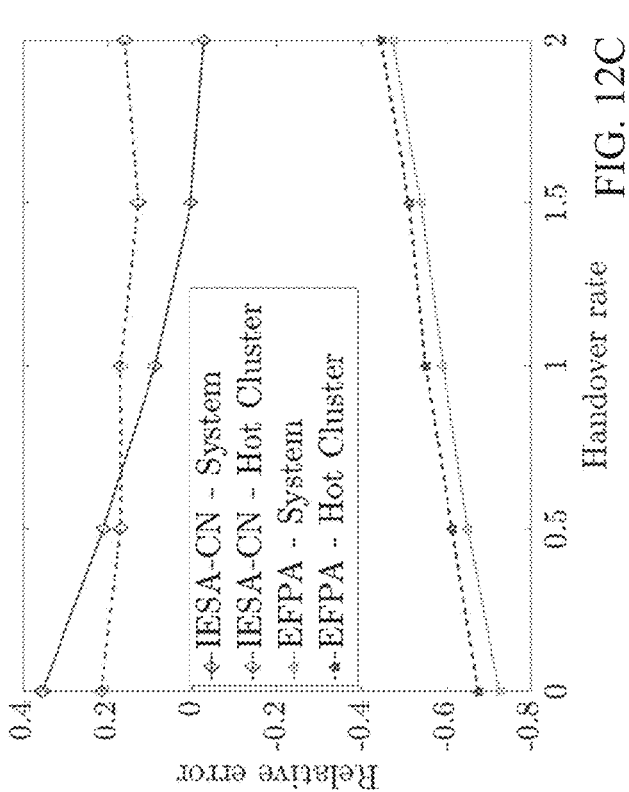

On the other hand, both IESA-CN and EFPA are quite accurate for Pattern D as shown in FIGS. 9C and 10C where there is no mutual traffic overflow so that the independence and Poisson errors due to overflow traffic do not exist. Referring to FIGS. 11A and 12A, there is shown the results for networks with all BS turned on, it is observed that IESA-CN is also accurate in a general cellular network with no BS in sleep mode. For the parameter sets considered in FIGS. 9 to 12, similar runs were also performed for Pattern B and the results were very similar to those for Pattern C presented in FIGS. 9B, 10B, 11C and 12C, respectively.

For all cases studied the IESA-CN is consistently more accurate than EFPA. While, despite that the computational efficiency of IESA-CN may not be as preferable as EFPA, it is much more efficient than the simulation method. Note that for almost all the cases studied the errors of the system and hot-cluster blocking probabilities estimated by IESA-CN are within 20% of the midpoint of the 95% confidence interval of the simulation results based on the Student's t-distribution.

Moreover, blocking probabilities in the range $10^{-3}$ to $10^2$ is preferable for cellular networks. As shown in the figures, the accuracy of IESA is particularly high for the cases where the blocking probability is in this range.

In addition, IESA-CN is a conservative estimation which gives blocking probabilities that are higher than actual values in most cases. In contrast, EFPA may be an aggressive estimation which gives lower-than-actual estimations. In many engineering applications such as network planning, conservative estimations are normally more desirable.

Figure 13A:
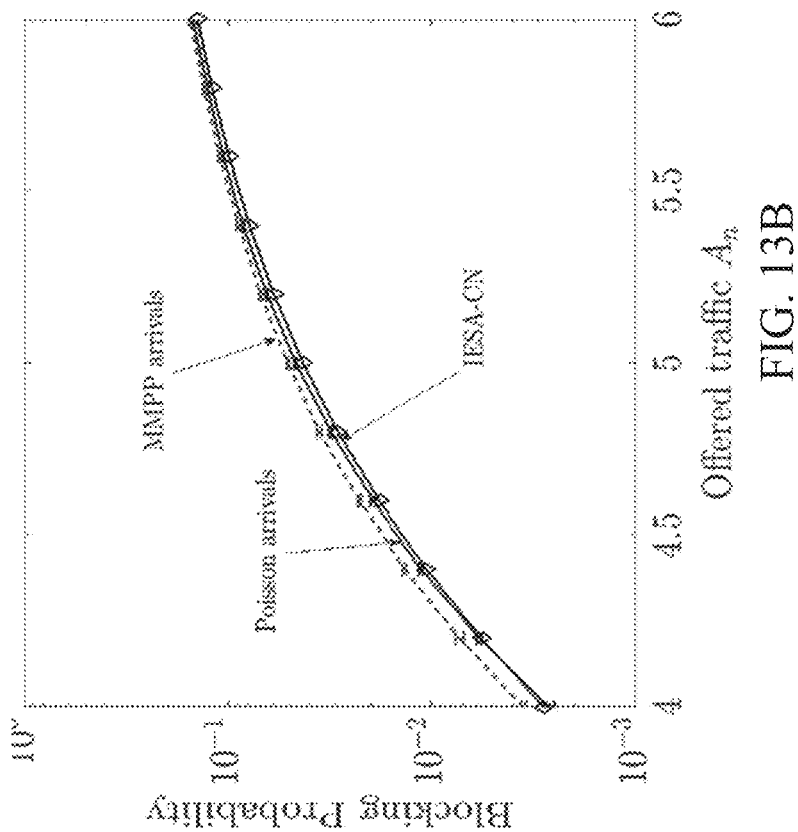
FIGS. 13A and 13B are plots showing different results of blocking probability comparison of Poisson and MMPP arrivals for different switching patterns of FIGS. 4A and 4B respectively ($\mu=1$, $\alpha=1.2$)
Figure 13B:
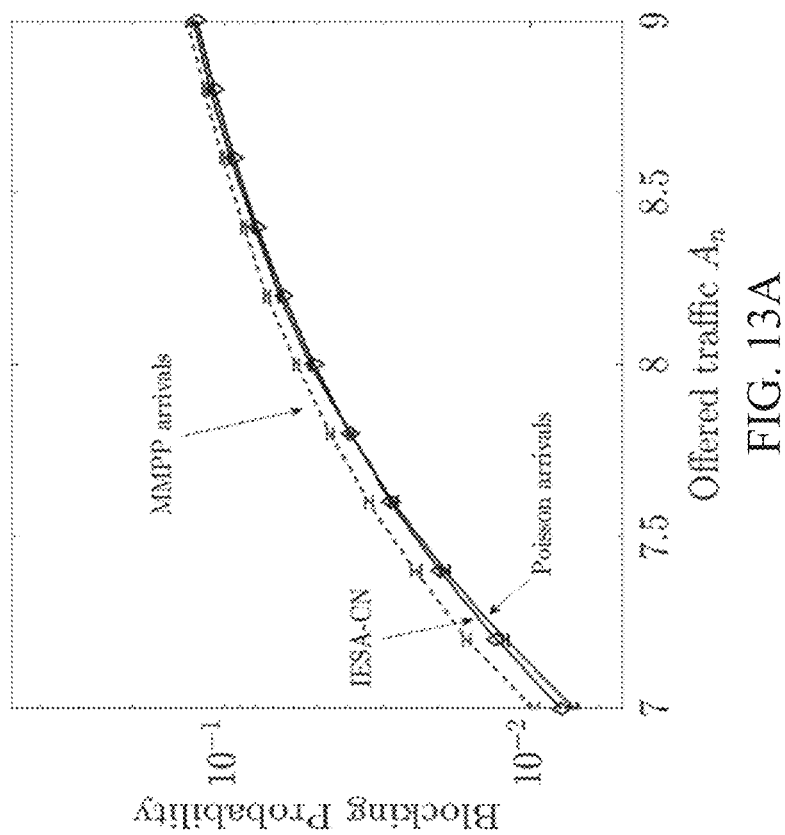

With reference to FIG. 13, it is demonstrated by simulation that if the arrival process is MMPP, the blocking probability will be slightly higher than Poisson arrival with the same offered traffic. In addition, IESA-CN is still a fairly accurate approximation even if the arrival process is MMPP. Therefore, it is desirable to use IESA-CN as an estimation tool for systems with MMPP arrivals when simulation results are not available.

Figure 14:
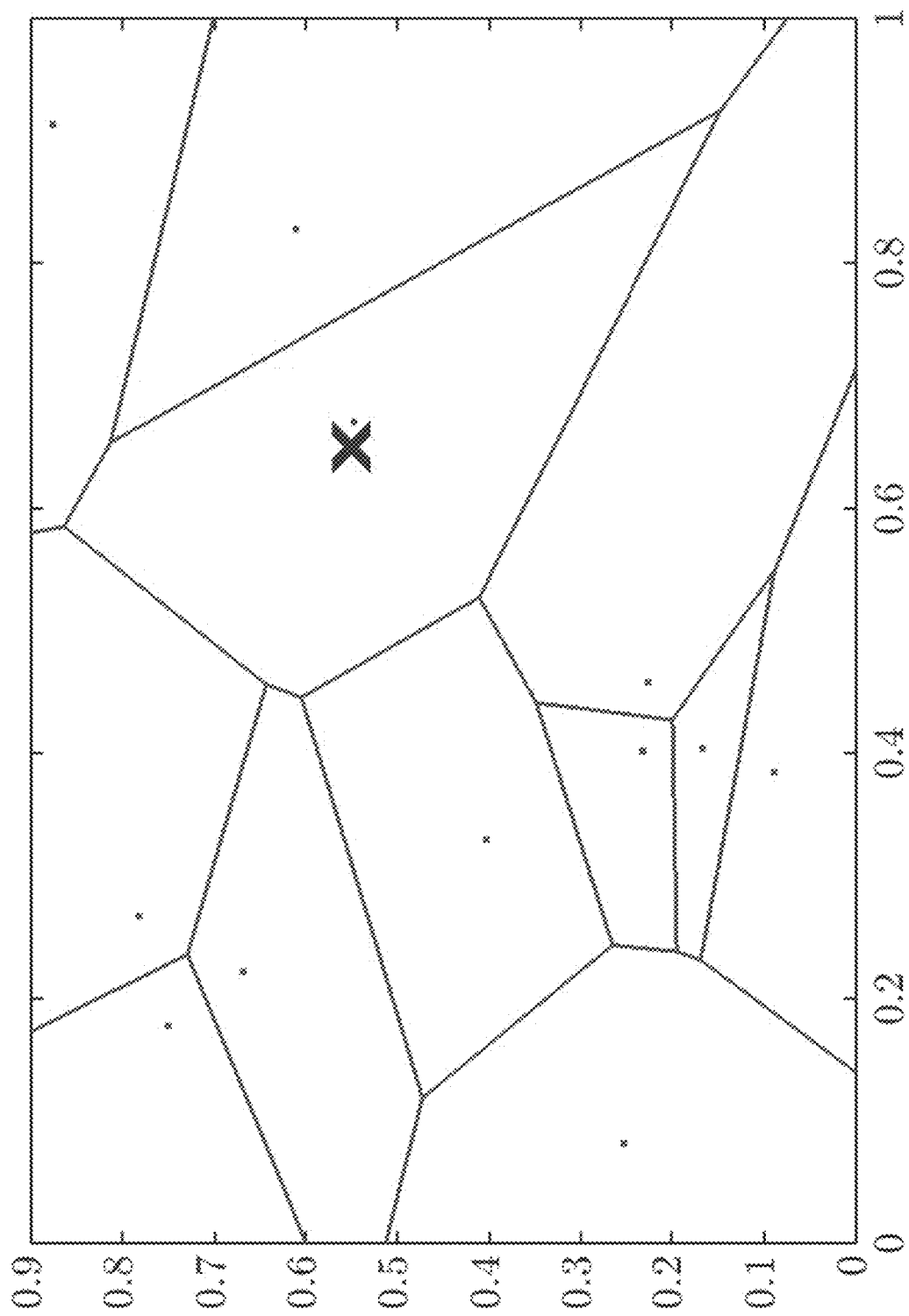
FIG. 14 is an illustration showing an example Poisson distributed BSs, wherein the cell boundaries are shown and form a Voronoi tessellation.

In addition to networks with homogeneous BS example of FIG. 3, with reference to FIG. 14, there is shown the approximation results of IESA-CN in a network with irregular topology based on Poisson distributed BSs. It is assumed that the offered traffic to each BS is the same and equal to $A_n$. Two cases were considered, one with all BSs active and the other with one BS sleeping (the BS shown with an "X" in FIG. 14).

Figure 15B:
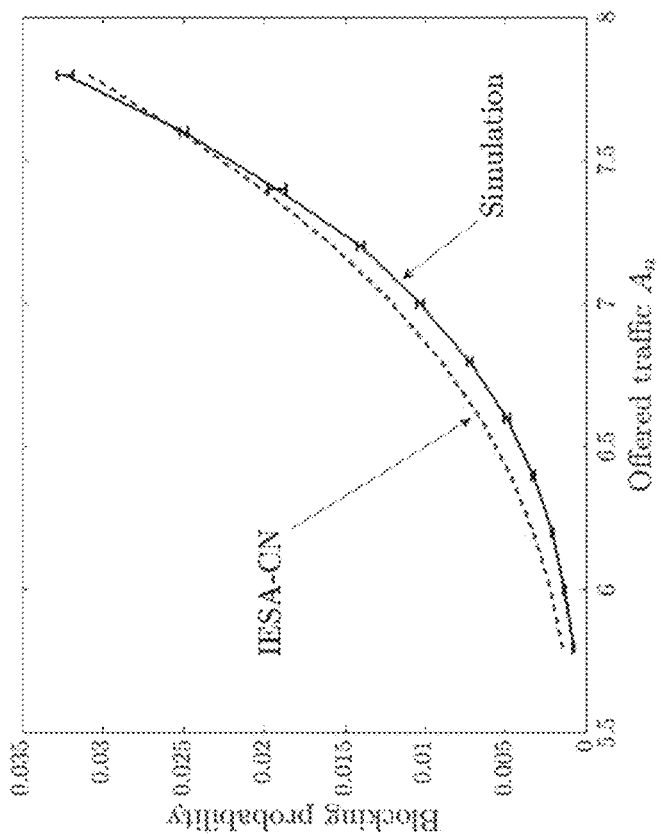
FIGS. 15A and 15B are plots showing different results of Blocking probability approximation for the network depicted in FIG. 14 with Poisson distributed BSs ($\mu=1$, $\delta=1$).
Figure 15A:
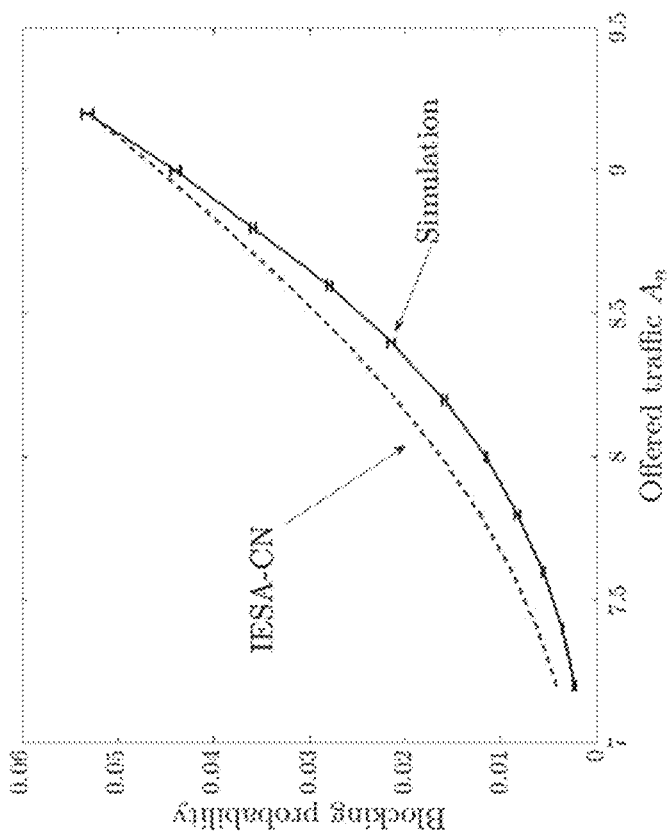

With reference to FIGS. 15A and 15B, for both cases, IESA-CN is demonstrated to provide reasonably accurate and relatively conservative estimations of blocking probabilities.

The following table shows the CPU running time of each evaluation method for selected switching patterns.

| Method | Pattern | Running time | No. of iterations |
| --- | --- | --- | --- |
| EFPA | All-on | 1.29 s | 48 |
| IESA-CN | All-on | 118.96 s | 35 |
| Markov chain simulation | All-on | 2.95 h | N/A |
| EFPA | A | 0.97 s | 38 |
| IESA-CN | A | 107.20 s | 36 |
| Markov chain simulation | A | 2.96 h | N/A |
| EFPA | B | 0.69 s | 30 |
| IESA-CN | B | 71.63 s | 22 |
| Markov chain simulation | B | 2.95 h | N/A |
| EFPA | C | 0.31 s | 30 |
| IESA-CN | C | 36.29 s | 20 |
| Markov chain simulation | C | 2.77 h | N/A |

It is shown that the running time of IESA-CN algorithm is approximately two orders of magnitude higher than that of EFPA due to the additional computations required for hierarchical application of EFPA to the surrogate model. However, considering the improvement in accuracy and the fact that EFPA is extremely fast, this increase in running time is acceptable. On the other hand, IESA-CN is much faster than the Markov chain simulation (which is faster than the discrete event simulation).

It will be appreciated that where the methods and systems of the present invention may also be either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a communication system, comprising the steps of:
   powering a plurality of base stations each operating in at least a sleep mode and an active mode based on a plurality of sleeping patterns, wherein the base station operates in the sleep mode with less power consumption than in the active mode;
   analyzing an overall power consumption for powering the plurality of base stations with respect to a grade of service of the communication system by estimating the overall power consumption and the grade of service of the communication system when the plurality of base stations operates based on each of the plurality of sleeping patterns; and
   switching at least one of the plurality of base stations to operate between the sleep mode and the active mode based on a result associated with the overall power consumption and/or the grade of service;
   wherein each of the plurality of base stations is further arranged to pass a service request to a neighboring base station in the plurality of base stations such that the service request is handled by the respective neighboring base station.

2. The method for operating a communication system in accordance with claim 1, wherein each of the plurality of sleeping patterns defines a relationship between a plurality of neighboring base stations.

3. The method for operating a communication system in accordance with claim 2, wherein each of the plurality of sleeping patterns includes at least one base station operating in the active mode and at least one base station operating in the sleep mode.

4. The method for operating a communication system in accordance with claim 2, wherein the base station operating in the sleep mode is arranged to overflow the service request reaching the respective base station to a surrogate base station of the plurality of neighboring base stations, wherein the surrogate base station is operating in the active mode.

5. The method for operating a communication system in accordance with claim 2, wherein the base station operating in the active mode is arranged to handover the service request being processed by the respective base station to a surrogate base station of the plurality of neighboring base stations, wherein the surrogate base station is operating in the active mode.

6. The method for operating a communication system in accordance with claim 1, wherein the step of switching at least one of the plurality of base stations to operate between the sleep mode and the active mode includes switching the plurality of base stations to operate in a selected one of the plurality of sleeping patterns.

7. The method for operating a communication system in accordance with claim 1, wherein the grade of service is represented by at least one attribute associated with the performance of the plurality of base station in processing service requests reaching the plurality of base stations.

8. The method for operating a communication system in accordance with claim 7, wherein the at least one attribute includes a blocking probability in processing the service requests and a predetermined traffic load offered by the communication system.

9. The method for operating a communication system in accordance with claim 8, further comprising the step of determining a representation associated with the at least one attribute and each of the plurality of sleeping patterns using an analytical approximation.

10. The method for operating a communication system in accordance with claim 9, wherein the representation is further associated with a handover rate of the service requests processed by the plurality of base stations.

11. The method for operating a communication system in accordance with claim 10, wherein the representation is further associated with parameters including an origin of the service request, an overflow record of the service request and an estimation of a network congestion within the plurality of base stations.

12. The method for operating a communication system in accordance with claim 1, wherein the plurality of base stations are arranged to facilitate a cellular network.

13. A communication system implementing the method of claim 1.

14. A communication system comprising:
a communication module including a plurality of base stations each arranged to operate in at least a sleep mode and an active mode based on a plurality of sleeping patterns, wherein the base station operates in the sleep mode with less power consumption than in the active mode;
an analyzer module arranged to analyze an overall power consumption for powering the plurality of base stations with respect to a grade of service of the communication system by estimating the overall power consumption and the grade of service of the communication system when the plurality of base stations operates based on each of the plurality of sleeping patterns; and
a controller arranged to switch at least one of the plurality of base stations to operate between the sleep mode and the active mode based on a result associated with the overall power consumption and/or the grade of service;
wherein each of the plurality of base stations is further arranged to pass a service request to a neighboring base station in the plurality of base stations such that the service request is handled by the respective neighboring base station.

15. The communication system in accordance with claim 14, wherein each of the plurality of sleeping patterns defines a relationship between a plurality of neighboring base stations.

16. The communication system in accordance with claim 15, wherein each of the plurality of sleeping patterns includes at least one base station operating in the active mode and at least one base station operating in the sleep mode.

17. The communication system in accordance with claim 15, wherein the base station operating in the sleep mode is arranged to overflow the service request reaching the respective base station to a surrogate base station of the plurality of neighboring base stations, wherein the surrogate base station is operating in the active mode.

18. The communication system in accordance with claim 15, wherein the base station operating in the active mode is arranged to handover the service request being processed by the respective base station to a surrogate base station of the plurality of neighboring base stations, wherein the surrogate base station is operating in the active mode.

19. The communication system in accordance with claim 14, wherein the controller is arranged to switch at least one of the plurality of base stations to operate between the sleep mode and the active mode by switching the plurality of base stations to operate in a selected one of the plurality of sleeping patterns.

20. The communication system in accordance with claim 14, wherein the grade of service is represented by at least one attribute associated with the performance of the plurality of base station in processing service requests reaching the plurality of base stations.

21. The communication system in accordance with claim 20, wherein the at least one attribute includes a blocking probability in processing the service requests and a predetermined traffic load offered by the communication system.

22. The communication system in accordance with claim 21, wherein the analyzer module is further arranged to determine a representation associated with the at least one attribute and each of the plurality of sleeping patterns using an analytical approximation.

23. The communication system in accordance with claim 22, wherein the representation is further associated with a handover rate of the service requests processed by the plurality of base stations.

24. The communication system in accordance with claim 23, wherein the representation is further associated with parameters including an origin of the service request, an overflow record of the service request and an estimation of a network congestion within the plurality of base stations.

25. A communication system comprising:
a communication module including a plurality of base stations each arranged to operate in at least a sleep mode and an active mode based on a plurality of sleeping patterns, wherein the base station operates in the sleep mode with less power consumption than in the active mode;
an analyzer module arranged to analyze an overall power consumption for powering the plurality of base stations with respect to a grade of service of the communication system by estimating the overall power consumption and the grade of service of the communication system when the plurality of base stations operates based on each of the plurality of sleeping patterns; and
a controller arranged to switch at least one of the plurality of base stations to operate between the sleep mode and the active mode based on a result associated with the overall power consumption and/or the grade of service;
wherein each of the plurality of base stations is further arranged to pass a service request to a neighboring base station in the plurality of base station such that the service request is handled by the respective neighboring base station, wherein the plurality of base stations are arranged to facilitate a cellular network.

* * * * *